(12) United States Patent
Bova et al.

(10) Patent No.: US 10,450,062 B1
(45) Date of Patent: Oct. 22, 2019

(54) VERSATILE MULTIROTOR AERIAL VEHICLES

(71) Applicant: Amazon Technologies, Inc., Seattle, WA (US)

(72) Inventors: Ubaldo Bova, Cambridge (GB); Christopher Gornall, Essex (GB); David Moro Ludena, Madrid (ES); Cyriel Notteboom, Cambridge (GB); Michael Piedmonte, Kirkland, WA (US); James Thomas, Cambridgeshire (GB)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 15/635,689

(22) Filed: Jun. 28, 2017

(51) Int. Cl.
*B64C 29/00* (2006.01)
*B64C 39/02* (2006.01)
*B64C 5/02* (2006.01)
*B64C 25/14* (2006.01)
(Continued)

(52) U.S. Cl.
CPC ............ *B64C 29/0033* (2013.01); *B64C 5/02* (2013.01); *B64C 5/06* (2013.01); *B64C 25/14* (2013.01); *B64C 39/024* (2013.01); *B64D 47/08* (2013.01); *B64C 2201/021* (2013.01); *B64C 2201/104* (2013.01); *B64C 2201/108* (2013.01); *B64C 2201/128* (2013.01)

(58) Field of Classification Search
CPC ......... B64C 29/0033; B64C 5/02; B64C 5/06; B64C 25/14; B64C 39/024; B64D 47/08
See application file for complete search history.

(56) References Cited

U.S. PATENT DOCUMENTS

| 5,941,478 A * | 8/1999 | Schmittle ................. B64C 1/00 244/120 |
| 8,903,568 B1 | 12/2014 | Wang et al. |
| 9,108,728 B2 * | 8/2015 | Shaw ...................... B64C 27/20 |

(Continued)

FOREIGN PATENT DOCUMENTS

| EP | 1232943 A3 | 2/2002 |
| EP | 2990332 A1 | 3/2016 |

(Continued)

OTHER PUBLICATIONS

International Search Report and Written Opinion for PCT Application No. PCT/US2017/023257 dated Jun. 21, 2017.

*Primary Examiner* — Justin M Benedik
(74) *Attorney, Agent, or Firm* — Athorus, PLLC

(57) ABSTRACT

An aerial vehicle having a single wing is configured for vertical-flight and forward-flight operations. The wing has a substantially high aspect ratio. The aerial vehicle includes tilt motor assemblies disposed at a forward end and an aft end of a fuselage. The tilt motor assemblies are configured to orient motors and rotors vertically, horizontally, or at any angle between vertical and horizontal. A pair of parallel booms are mounted beneath the wing on either side of the fuselage. Each of the booms has at least one vertically oriented motor and rotor associated therewith, and a vertical fin extending thereunder. Additionally, a forward tilt motor assembly includes a rotatable extension that is deployed when the motor assembly is configured for vertical flight, enabling the aerial vehicle to land on the vertical fins and the landing rotatable extension.

20 Claims, 16 Drawing Sheets

(51) Int. Cl.
  *B64C 5/06* (2006.01)
  *B64D 47/08* (2006.01)

(56) References Cited

U.S. PATENT DOCUMENTS

| | | | |
|---|---|---|---|
| 9,187,174 B2* | 11/2015 | Shaw | B64C 27/28 |
| 2003/0062443 A1* | 4/2003 | Wagner | B64C 3/56 |
| | | | 244/12.3 |
| 2010/0224723 A1 | 9/2010 | Apkarian | |
| 2016/0129998 A1* | 5/2016 | Welsh | B64C 39/024 |
| | | | 244/12.3 |
| 2017/0057630 A1 | 3/2017 | Schwaiger | |

FOREIGN PATENT DOCUMENTS

| | | |
|---|---|---|
| WO | 2013098736 A3 | 7/2013 |
| WO | 2015124556 A1 | 8/2015 |

\* cited by examiner

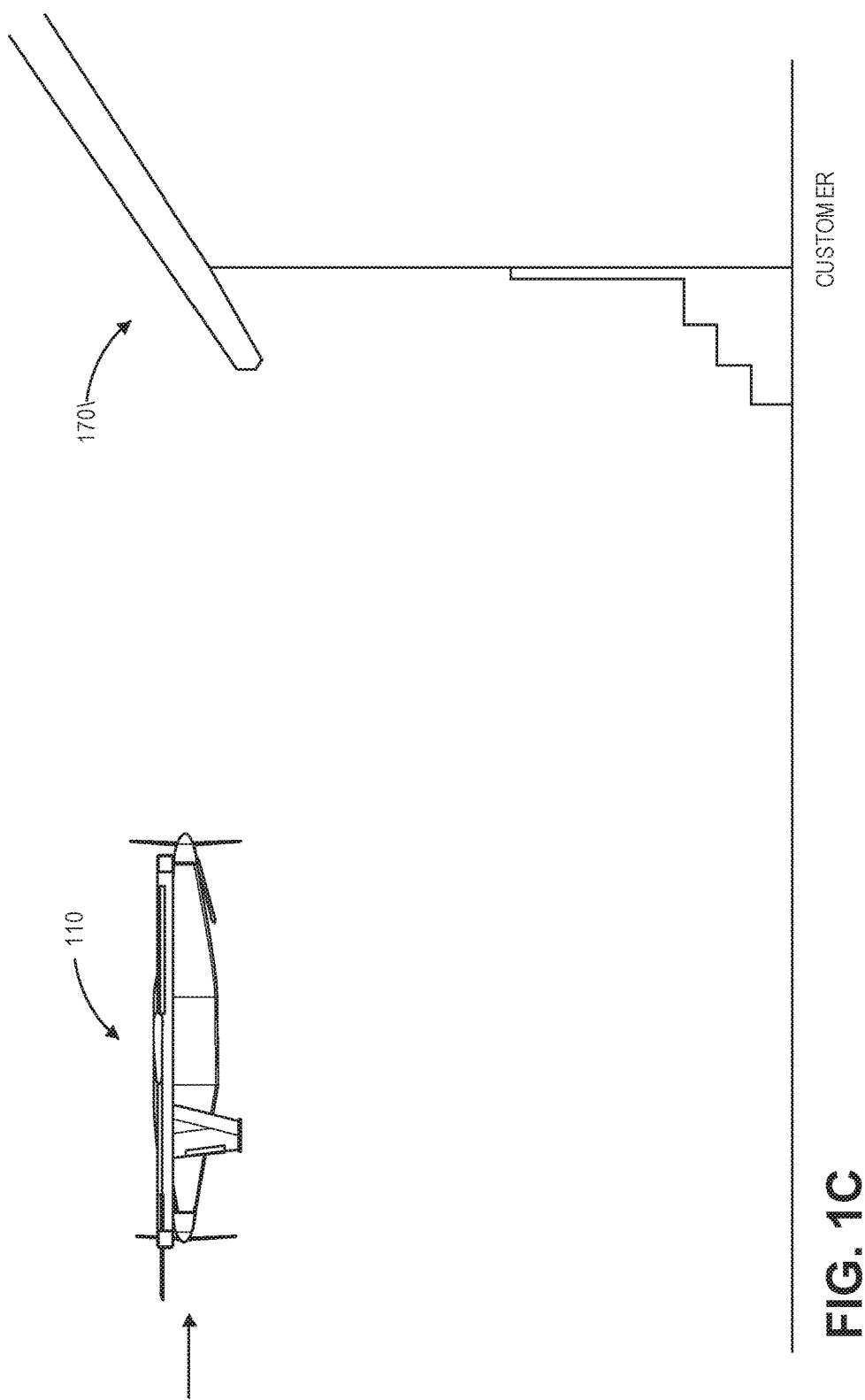

VERSATILE MULTIROTOR AERIAL VEHICLES

BACKGROUND

Many aerial vehicles (e.g., manned or unmanned vehicles such as airplanes, helicopters or other airships) are configured to operate in two or more flight modes. As one example, an aerial vehicle may be configured to engage in forward flight, or substantially horizontal flight, a mode in which the aerial vehicle travels from one point in space (e.g., a land-based point or, alternatively, a sea-based or air-based point) to another point by traveling over at least a portion of the Earth. In forward flight, the aerial vehicle may be maintained aloft by one or more net forces of lift that are typically induced by airflow passing over and below wings, consistent with a pressure gradient. As another example, an aerial vehicle may be configured to engage in vertical flight, a mode in which the aerial vehicle travels in a vertical or substantially vertical direction from one altitude to another altitude (e.g., upward or downward, from a first point on land, on sea or in the air to a second point in the air, or vice versa) substantially normal to the surface of the Earth, or hovers (e.g., maintains a substantially constant altitude), with an insubstantial change in horizontal or lateral position. In vertical flight, the aerial vehicle may be maintained aloft by one or more net forces of lift that are typically induced by rotating blades of a propeller or another source. As yet another example, an aerial vehicle may be configured to engage in both forward and vertical flight, a hybrid mode in which a position of the aerial vehicle changes in both horizontal and vertical directions.

An aerial vehicle that is configured to operate in multiple modes may utilize one or more propulsion systems and/or control surfaces (e.g., wings, rudders, flaperons, elevons, elevators, ailerons, flaps or other components) at different times, depending on requirements of a given mission in which the aerial vehicle is to operate in each of such modes. For example, an aerial vehicle may utilize a first set of motors or rotors when operating in forward flight, and a second set of motors or rotors when operating in horizontal flight. Likewise, the aerial vehicle may utilize a first set of control surfaces when operating in horizontal flight, and a second set of control surfaces when operating in vertical flight.

BRIEF DESCRIPTION OF THE DRAWINGS

FIGS. 1A through 1F are views of aspects of one system including a multirotor aerial vehicle in accordance with embodiments of the present disclosure.

DETAILED DESCRIPTION

As is set forth in greater detail below, the present disclosure is directed to versatile single-wing aerial vehicles having multiple propellers (or rotors). More specifically, one or more of the propellers may be mounted in a fixed alignment for providing forces of lift, while one or more of the propellers may be mounted in a variable alignment that may be vertical or horizontal, enabling the propellers to provide forces of lift or thrust. The single wing may be a high-aspect ratio wing having one or more pairs of ailerons or flaps that is joined to a fuselage, and a zero or low dihedral angle. In some embodiments, the construction of the fuselage is symmetrical with respect to a longitudinal axis, a yaw axis and a lateral axis. Additionally, a pair of booms may be mounted in parallel with a longitudinal axis of the fuselage and/or the aerial vehicle. Each of the booms may provide support for one or more propellers and motors, as well as a rudder or fin disposed beneath each of the booms. The fuselage may further include one or more variable tilt motors and propellers disposed at forward and aft ends. A tail shroud may be mounted to a trailing edge of the single wing on either side of the longitudinal axis and may extend astern of the booms and the fuselage, to provide static stability to the aerial vehicle during forward flight, and protection to the propellers during operation. Additionally, a single landing gear extension may be mounted to a forward section of the fuselage. When the extension is deployed, the extension and the rudders or fins may form a tripod arrangement that enables the aerial vehicle to safely land on, or take off from, a planar surface. The arrangement of the propellers and the wing, with respect to the fuselage, enables a payload to be engaged in a statically stable manner, and to thus be adequately supported in both forward and vertical flight operations.

Figure 1A:
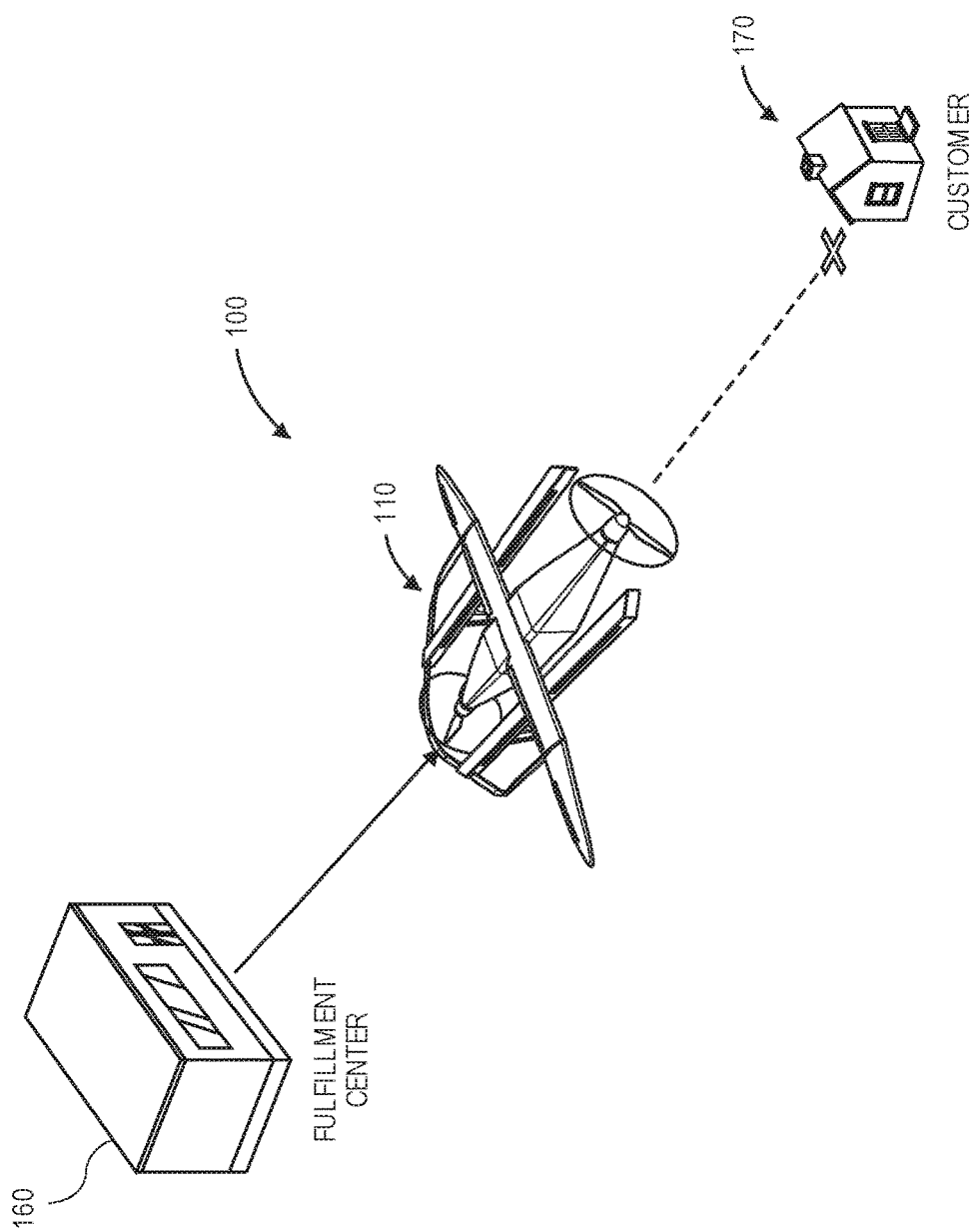

Referring to FIGS. 1A through 1F, views of aspects of one system 100 including a multirotor aerial vehicle 110 in accordance with embodiments of the present disclosure are shown. As is shown in FIG. 1A, the aerial vehicle 110 is engaged in forward-flight operations and delivering a payload (e.g., a parcel having one or more ordered items) from a fulfillment center 160 (or a warehouse or other facility or source of items) to a destination associated with a customer 170 (e.g., a home, an office or another location).

Figure 1B:
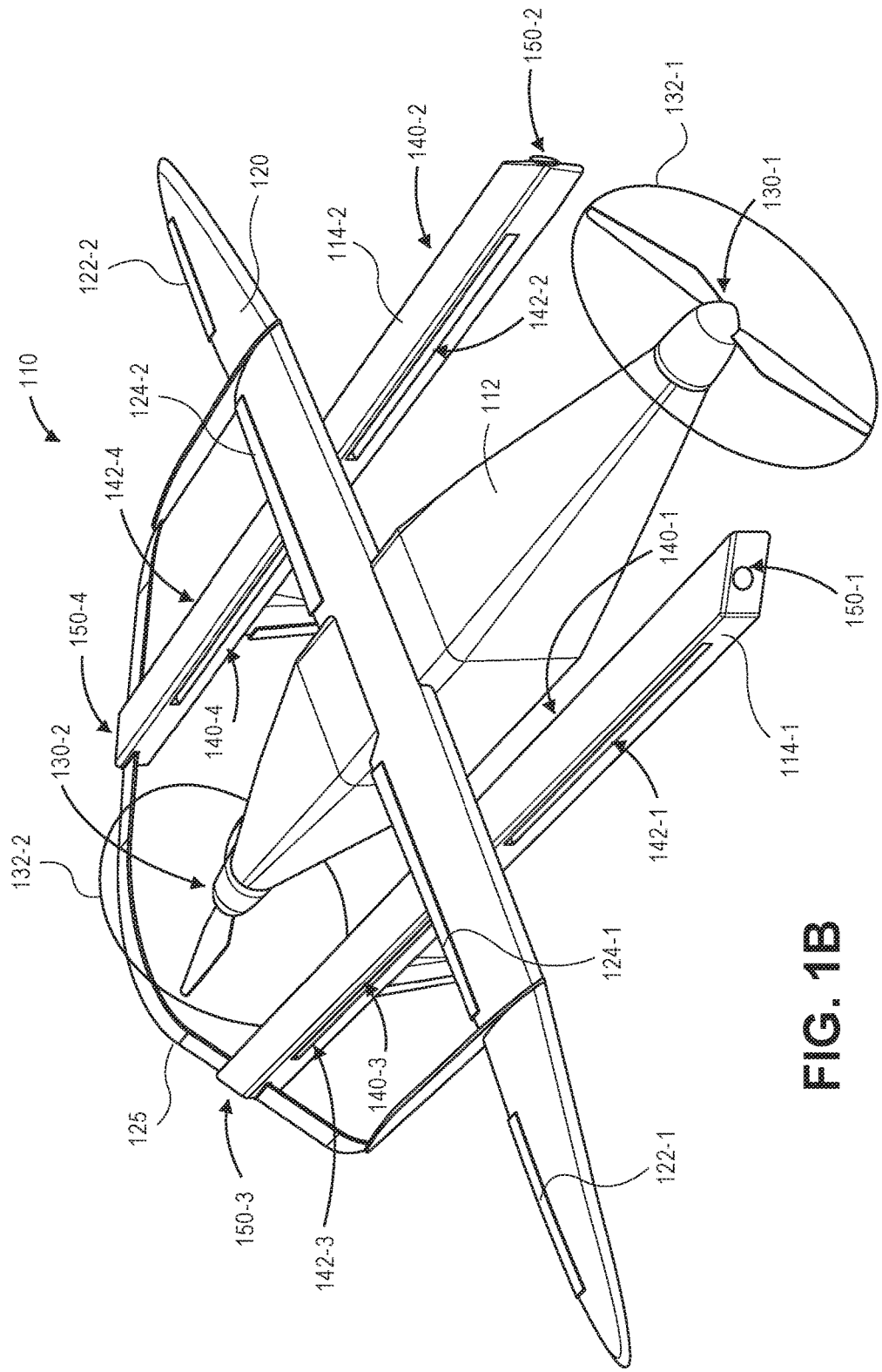

As is shown in FIG. 1B, the aerial vehicle 110 includes a fuselage 112, a pair of booms 114-1, 114-2, a wing 120 and a tail shroud 125. The fuselage 112 is symmetrically shaped along a longitudinal axis of the aerial vehicle 110, e.g., with a box-like central structure and narrowing pyramidal sections extending forward and aft therefrom. The fuselage 112 includes a forward variable tilt motor assembly 130-1 and an aft variable tilt motor assembly 130-2 disposed at forward and aft ends of the fuselage 112, respectively. The forward and aft variable tilt motor assemblies 130-1, 130-2 each include propulsion motors that are configured to rotate forward and aft propellers 132-1, 132-2, respectively, about axes defined by their respective shafts. For example, the forward and aft variable tilt motor assemblies 130-1, 130-2 may rotate the forward and aft propellers 132-1, 132-2 about substantially horizontal axes, or axes that are parallel to the longitudinal axis of the aerial vehicle 110, to generate thrust forces for forward flight operations, such as is shown in FIG. 1A. The forward and aft variable tilt motor assemblies 130-1, 130-2 may also pivot to rotate the forward and aft propellers 132-1, 132-2 about substantially vertical axes, or axes that are parallel to a vertical axis (or yaw axis) of the aerial vehicle 110, to generate lift forces for vertical flight operations. Alternatively, the forward and aft variable tilt motor assemblies 130-1, 130-2 may rotate the forward and aft propellers 132, 1, 132-2 about axes that are aligned at any angles between vertically upward and vertically downward, to generate a combination of lift and/or thrust forces, as desired.

The booms 114-1, 114-2 are mounted, in parallel, to undersides of the wing 120 on starboard and port sides, respectively, of the fuselage 112. The boom 114-1 provided on the starboard side of the fuselage includes a pair of propulsion motors 140-1, 140-3 mounted therein. Each of the propulsion motors 140-1, 140-3, is configured to rotate a propeller 142-1, 142-3 about an axis that is parallel to a vertical axis (or yaw axis) of the aerial vehicle 110, or is nearly parallel to the vertical axis, and to generate forces of lift thereby. For example, the propulsion motors 140-1, 140-3 may be oriented vertically, e.g., parallel to the yaw axis, or at a slight cant inward, e.g., toward the fuselage 112, within or in association with the booms 114-1, 114-3. Similarly, the boom 114-2 provided on the port side of the fuselage 112 also includes a pair of propulsion motors 140-2, 140-4 mounted therein. Each of the propulsion motors 140-2, 140-4, is configured to rotate a propeller 142-2, 142-4 about an axis that is parallel to the vertical axis (or yaw axis) of the aerial vehicle 110, or is nearly parallel to the vertical axis, and to generate forces of lift thereby. For example, the propulsion motors 140-2, 140-4 may be oriented vertically, e.g., parallel to the yaw axis, or at a slight cant inward, e.g., toward the fuselage 112, within or in association with the booms 114-1, 114-2.

When the propulsion motors 140-1, 140-2, 140-3, 140-4 are stopped, such as is shown in FIG. 1B, the propellers 142-1, 142-2, 142-3, 142-4 are housed within the respective booms 114-1, 114-2, to reduce the effects of drag on the aerial vehicle 110. Additionally, each of the booms 114-1, 114-2 further includes a camera (or other imaging device) 150-1, 150-2, 150-3, 150-4 disposed at forward and aft ends. The cameras 150-1, 150-2, 150-3, 150-4 may be configured to capture imaging data of any type or form within their respective fields of view, and such data may be utilized in navigation or any other aspect of the operation of the aerial vehicle 110 (e.g., in monitoring or surveillance operations). For example, the cameras 150-1, 150-2, 150-3, 150-4 may be used to search for, recognize and identify one or more stationary or airborne objects, or to assess the risks of operating in a given environment based on the presence or absence of one or more of such objects, as well as to recognize one or more fiducial markings or other indicia. Although the embodiment of the aerial vehicle 110 shown in FIG. 1B includes four cameras 150-1, 150-2, 150-3, 150-4 provided on forward and aft ends of the aerial vehicle 110, e.g., to provide coverage substantially around a perimeter of the aerial vehicle 110, and on both port and starboard sides of the fuselage 112, those of ordinary skill in the pertinent arts will recognize that an aerial vehicle may include any number of cameras or other imaging devices in accordance with the present disclosure, and that imaging data captured using such cameras or imaging devices may be utilized for any purpose or function.

As is shown in FIG. 1B, the boom 114-1 has an open, substantially rectangular cross-section that houses or conceals the propulsion motors 140-1, 140-3 therein. Alternatively, in one or more embodiments, the boom 114-1 may include a cross-section of any other shape, and may be configured for mounting the propulsion motors 140-1, 140-3 and/or the propellers 142-1, 142-3 above, below or alongside the boom 114-1. In such embodiments, when the propulsion motors 140-1, 140-3 are stopped, the propellers 142-1, 142-3 may be aligned along an axis of the boom 114-1, e.g., parallel to a longitudinal axis of the aerial vehicle 110, in order to minimize drag. Like the boom 114-1, the boom 114-2 may have an open, substantially rectangular cross-section that houses or conceals the propulsion motors 140-2, 140-4 therein, but may include a cross-section of any other shape, or may be configured for mounting the propulsion motors 140-2, 140-4 and/or the propellers 142-2, 142-4 above, below or alongside the boom 114-2. In such embodiments, when the propulsion motors 140-2, 140-4 are stopped, the propellers 142-2, 142-4 may be aligned along an axis of the boom 114-2, e.g., parallel to a longitudinal axis of the aerial vehicle 110, in order to minimize drag.

The wing 120 is mounted to the fuselage 112 at a central root section, and extends transversely with respect to the fuselage 112 in port and starboard directions. The wing 120 is substantially long and narrow, with a relatively high aspect ratio (e.g., a ratio of a wingspan to a mean chord, or a square of the wingspan divided by an area of the wing). The dimensional characteristics of the wing 120 shown in FIG. 1B provide the aerial vehicle 110 with lower induced drag and greater lift as compared to wings having lower aspect ratios. As is shown in FIG. 1B, the wing 120 also has a zero or low (e.g., near-zero) dihedral angle.

Additionally, as is shown in FIG. 1B, trailing edges of the wing 120 include a pair of flaperons 122-2, 124-2 (or elevons, elevators, ailerons, flaps, brakes, slats or other control surfaces) provided on the port side of the fuselage 112 and a pair of flaperons 122-1, 124-1 provided on the starboard side of the fuselage 112.

The tail shroud 125 is joined to the trailing edges of the wing 120 on port and starboard sides of the fuselage 112, as well as to aft ends of each of the booms 114-1, 114-2. The tail shroud 125 wraps around a stern of the fuselage 112, thereby protecting the aft variable tilt motor assembly 130-2 and the propeller 132-2, and also the propellers 142-1, 142-2, 142-3, 142-4, against contact with one or more objects and/or structures, including but not limited to one or more other aerial vehicles. The shape and construction of the tail shroud 125 provide lateral protection to the rotating propellers 132-1, 132-2, 142-1, 142-2, 142-3, 142-4, and to such objects and/or structures, regardless of the operating mode (e.g., forward-flight or vertical-flight) of the aerial vehicle 110. The tail shroud 125 also enhances the stability of the aerial vehicle 110 during forward-flight operations by stiffening the aerial vehicle 110 about a vertical axis (or yaw axis), thereby resisting rotations about the vertical axis (or yaw axis).

During forward flight operations of the aerial vehicle 110, such as is shown in FIGS. 1A and 1B, each of the forward variable tilt motor assembly 130-1 and the aft variable tilt motor assembly 130-2 is co-aligned with a longitudinal axis of the aerial vehicle 110, which is defined with respect to the fuselage 112. During such operations, the forward variable tilt motor assembly 130-1 is in a tractor configuration, and the aft variable tilt motor assembly 130-2 is in a pusher configuration, such that the rotation of each of the propellers 132-1, 132-2 provides thrust in a forward direction along the longitudinal axis of the aerial vehicle 110. As is shown in FIG. 1C, when the aerial vehicle 110 approaches its destination, the aerial vehicle 110 may begin a transition to vertical-flight or hovering operations.

Figure 1D:
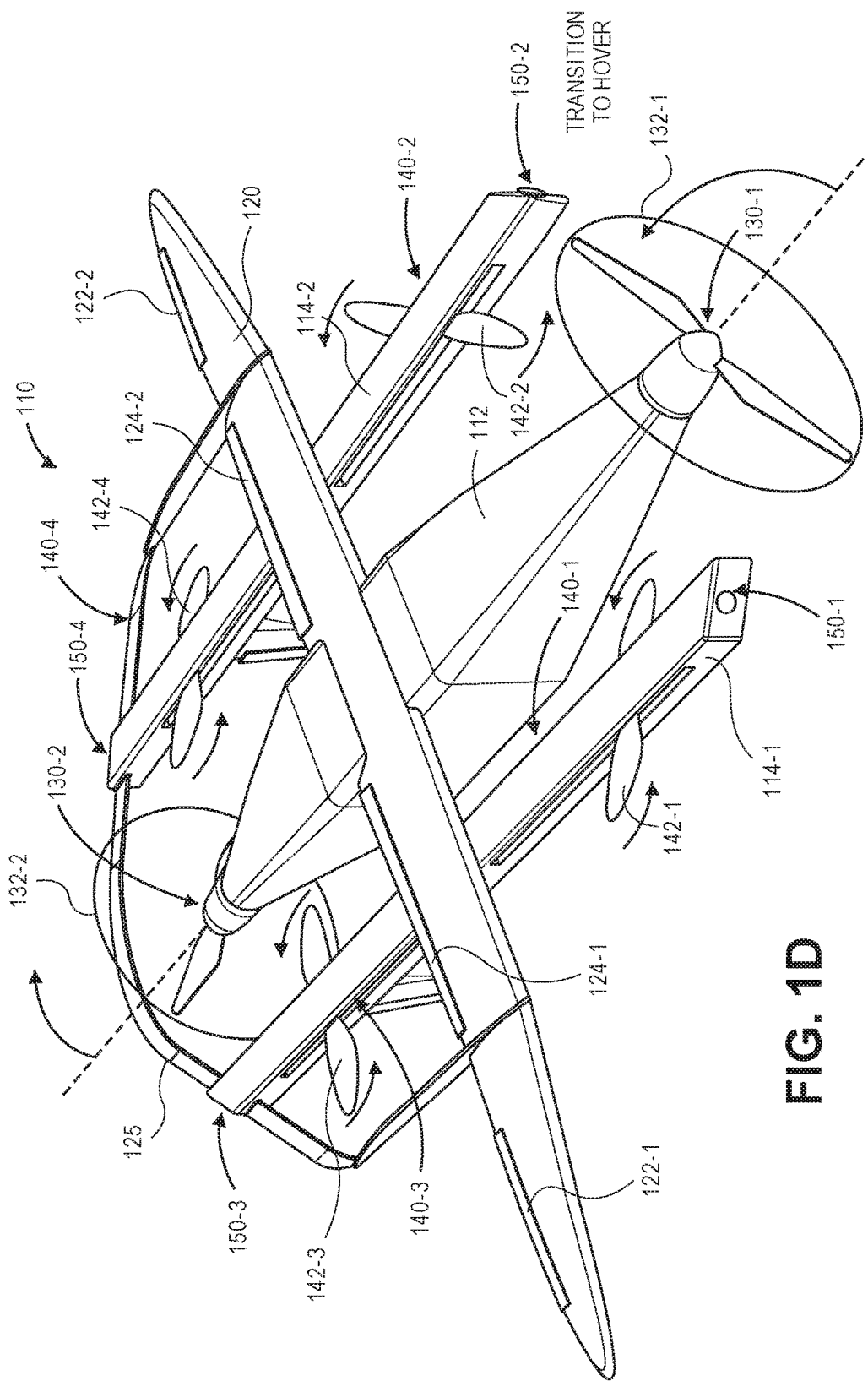

As is shown in FIG. 1D, when the aerial vehicle 110 transitions to vertical-flight operations, the forward variable tilt motor assembly 130-1 and the aft variable tilt motor assembly 130-2 may begin to tilt upwardly, respectively, as operations of the propulsion motors 140-1, 140-2, 140-3, 140-4 are initiated, thereby causing the propellers 142-1, 142-2, 142-3, 142-4 to rotate. The repositioning of the variable tilt motor assemblies 130-1, 130-2 and the operations of the propulsion motors 140-1, 140-2, 140-3, 140-4 may be initiated in any sequence, and as functions of altitude and/or airspeed, or any other parameter. For example, where the aerial vehicle 110 transitions from forward-flight to vertical-flight operations, the aft variable tilt motor assembly 130-2 may be tilted upwardly and forward first, thereby causing the aerial vehicle 110 to begin to slow.

Additionally, a direction of rotation of the aft variable tilt motor assembly 130-2 must be reversed, thereby converting the aft variable tilt motor assembly 130-2 from a pusher configuration to a tractor configuration, and reducing a direction of force generated by the aft propeller 132-2 to account for the reorientation of the aft variable tilt motor assembly 130-2 from a forward-flight orientation (e.g., along the longitudinal axis of the aerial vehicle 110) to a vertical flight orientation (e.g., parallel to a normal axis of the aerial vehicle 110). After the aft variable tilt motor assembly 130-2 has been reoriented, and the direction of rotation has been reversed, the forward variable tilt motor assembly 130-1 may tilt upwardly and aft. The direction of rotation of the forward variable tilt motor assembly 130-1 need not be reversed, however, because the forward variable tilt motor assembly 130-1 remains in a tractor configuration even after the forward variable tilt motor assembly 130-1 has been reoriented. After each of the forward variable tilt motor assembly 130-1 and the aft variable tilt motor assembly 130-2 has been reoriented, or prior to reorienting the forward variable tilt motor assembly 130-1 and the aft variable tilt motor assembly 130-2, operations of the propulsion motors 140-1, 140-2, 140-3, 140-4 may be initiated.

Figure 1E:
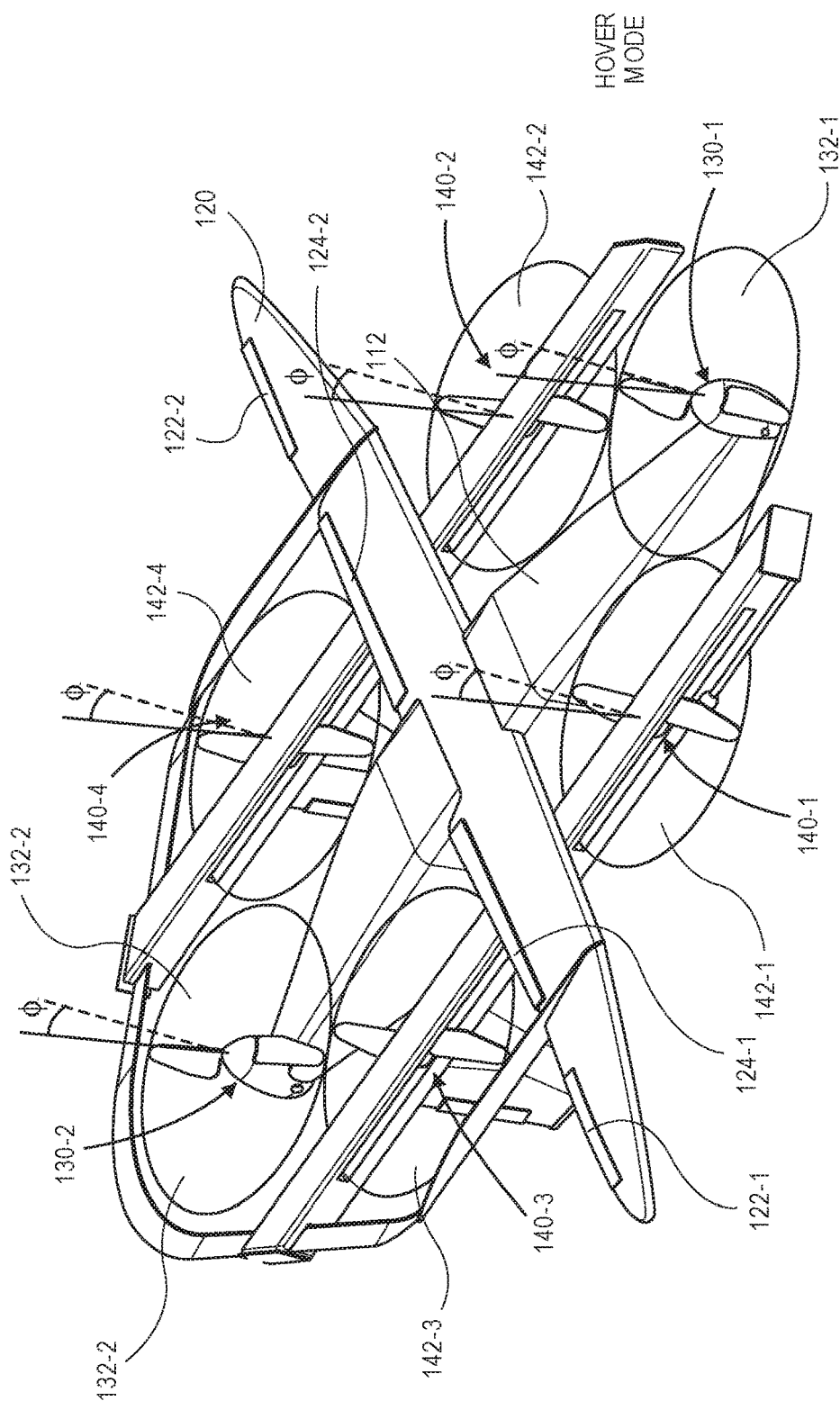
Figure 1F:
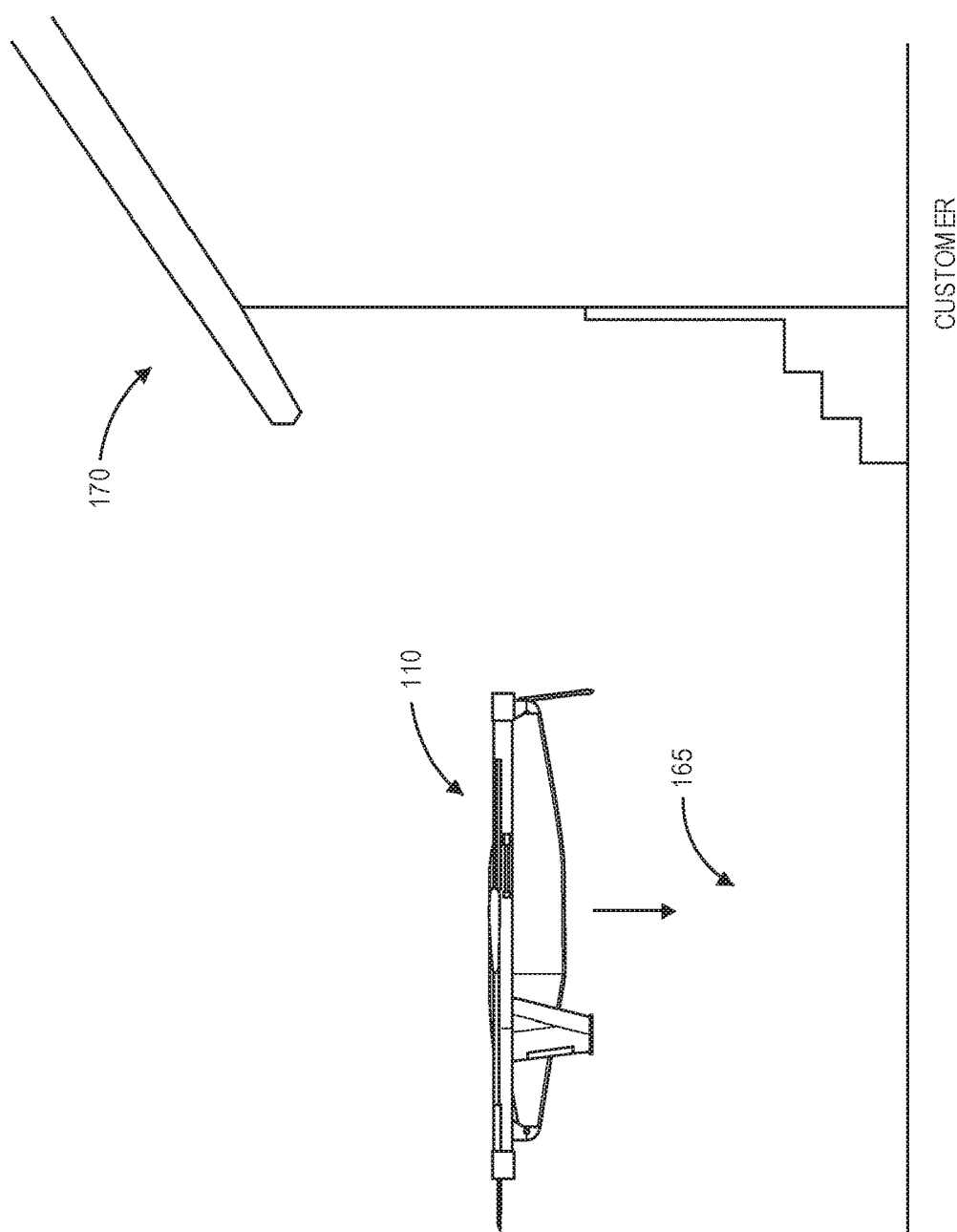

As is shown in FIG. 1E, the variable tilt motor assemblies 130-1, 130-2 and the propulsion motors 140-1, 140-2, 140-3, 140-4 are rotating the propellers 132-1, 132-2, 142-1, 142-2, 142-3, 142-4 in a common plane, and the aerial vehicle 110 is configured for vertical-flight and/or hovering operations. The rotational speeds of one or more of the variable tilt motor assemblies 130-1, 130-2 and the propulsion motors 140-1, 140-2, 140-3, 140-4 may be varied, as necessary, to provide sufficient forces of lift, on an as needed basis. For example, as is shown in FIG. 1F, the forces of lift generated by the variable tilt motor assemblies 130-1, 130-2 and the propulsion motors 140-1, 140-2, 140-3, 140-4 may be varied to cause the aerial vehicle 110 to descend to the destination, e.g., in order to deposit a payload at the destination, or to retrieve a payload therefrom. Alternatively, in embodiments in which the propulsion motors 140-1, 140-2, 140-3, 140-4 are aligned at slight inward cant angles, the variable tilt motor assemblies 130-1, 130-2 rotate the propellers 132-1, 132-2 in a common (e.g., horizontal) plane, while the propulsion motors 140-1, 140-2 rotate the propellers 142-1, 142-2 in a common plane and about axes that are each angled toward the fuselage 112, and the propulsion motors 140-3, 140-4 rotate the propellers 142-3, 142-4 in another common plane and about axes that each are angled toward the fuselage 112.

The forward and aft variable tilt motor assemblies 130-1, 130-2 may include any devices or components that enable the respective assemblies to be repositioned from their respective forward-flight orientations shown in FIG. 1D to their vertical-flight orientations shown in FIG. 1E, and back to the orientations shown in FIG. 1D. For example, each of the tilt motor assemblies 130-1, 130-2 may include one or more servos, gears or gear assemblies, thrust bearings and/or any other components for rotating the tilt motor assemblies 130-1, 130-2 between such orientations. Moreover, the operation of the tilt motor assemblies 130-1, 130-2, as well as the propulsion motors 140-1, 140-2, 140-3, 140-4, the cameras 150-1, 150-2, 150-3, 150-4 or any other sensors, systems or other components (e.g., payload engagements systems) provided aboard the aerial vehicle 110 may be controlled or manipulated by a control system having one or more processors, memory components, electronic speed controls, controllers, power supplies and/or interfaces. Furthermore, depending on the capacities of the tilt motor assemblies 130-1, 130-2 and/or one or more dimensions or other attributes of the propellers 132-1, 132-2, the aerial vehicle 110 may be operated in forward flight with only one of the tilt motor assemblies (e.g., either the forward tilt motor assembly 130-1 or the aft tilt motor assembly 130-2) provided in a forward-flight orientation.

Accordingly, the systems and methods of the present disclosure are directed to versatile multirotor aerial vehicles having a single-wing construction. The aerial vehicles may include tilt motor assemblies disposed at forward and aft ends of a fuselage, with each of the motor assemblies being configured to rotate propellers about horizontal axes, or about vertical axes, or about axes aligned at angles other than horizontal or vertical. The aerial vehicles may further include booms provided on port and starboard sides of the fuselage, with each of the booms being outfitted with one or more propulsion motors configured to rotate propellers about substantially vertical axes. Thus, the aerial vehicles may readily transfer between vertical-flight and forward-flight operations by reorienting the tilt motor assemblies and starting (or stopping) the propulsion motors associated with the booms. Forces of lift may be generated by the single wing during forward-flight operations, and by one or more of the vertically aligned propellers during vertical-flight operations. Moreover, the aerial vehicles may include landing gear components that are associated with one or more of the tilt motor assemblies. The landing gear components are configured for extension when the aerial vehicle is configured for vertical-flight operations, and for retraction when the aerial vehicle is configured for forward-flight operations.

Referring to FIGS. 2A through 2D, views of aspects of one multirotor aerial vehicle in accordance with embodiments of the present disclosure are shown. Except where otherwise noted, reference numerals preceded by the number "2" shown in FIGS. 2A through 2D indicate components or features that are similar to components or features having reference numerals preceded by the number "1" shown in FIGS. 1A through 1F.

Figure 2A:
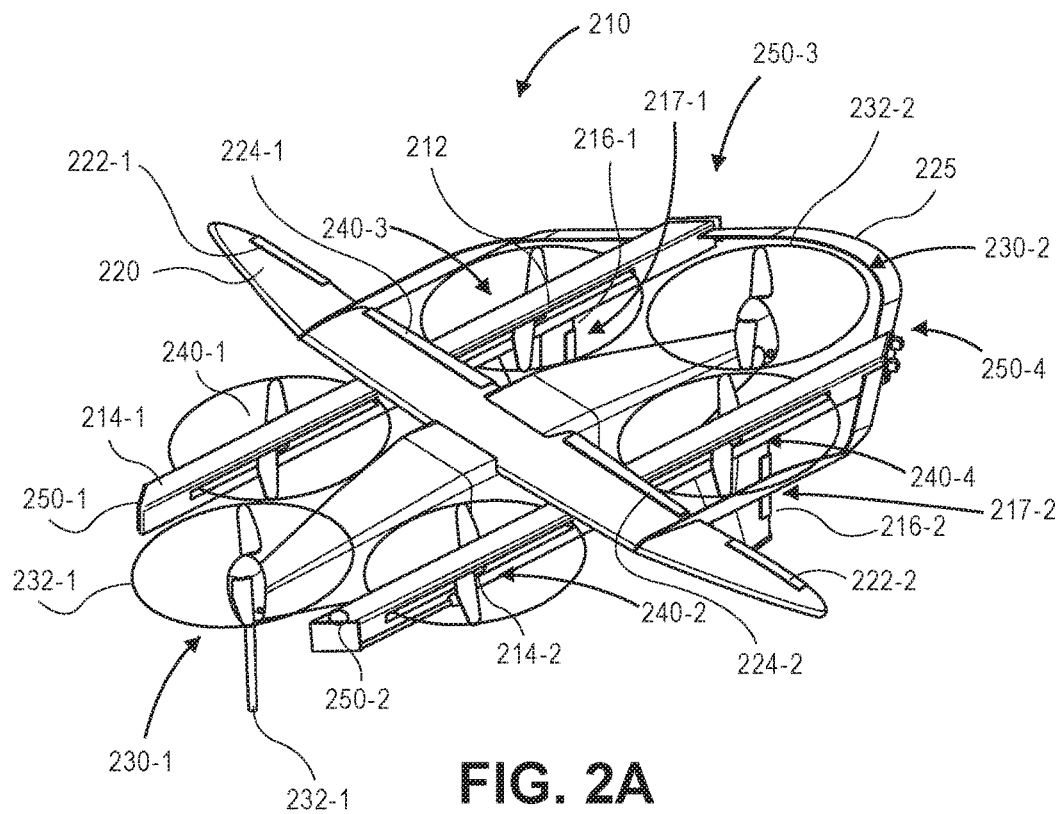
FIGS. 2A through 2D are views of aspects of one multirotor aerial vehicle in accordance with embodiments of the present disclosure.
Figure 2B:
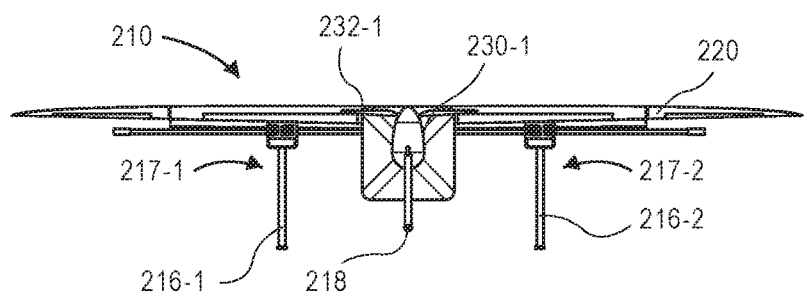
Figure 2C:
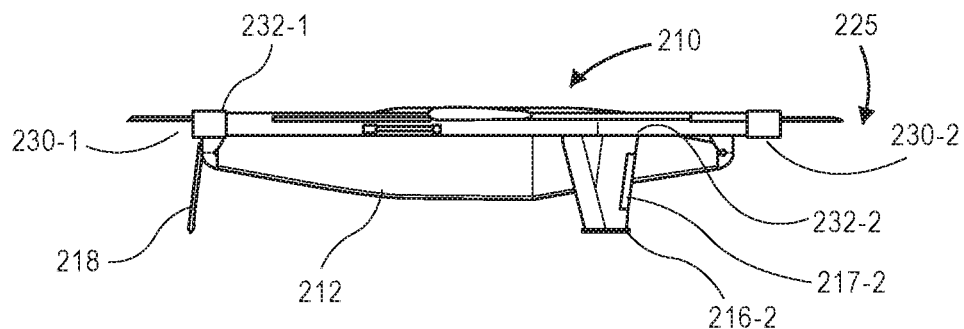
Figure 2D:
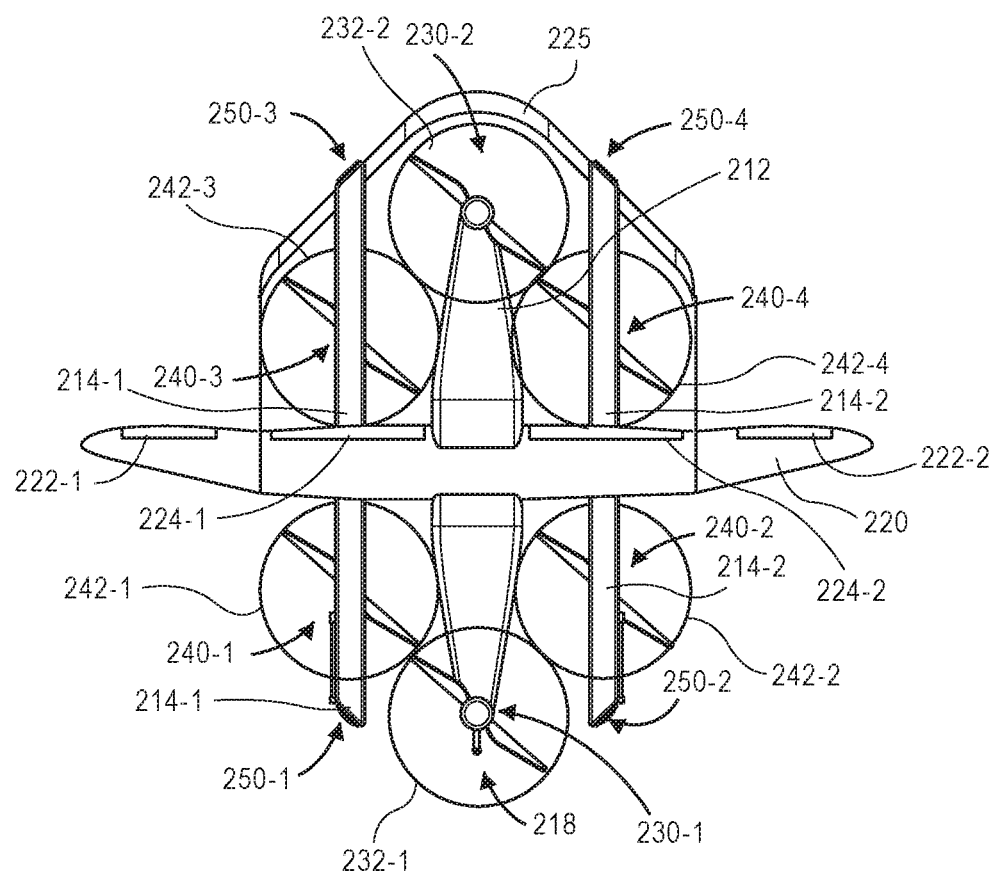

FIG. 2A is a perspective view of the aerial vehicle 210 configured for forward-flight operations. FIG. 2B is a front view of the aerial vehicle 210. FIG. 2C is a side view of the aerial vehicle 210. FIG. 2D is a top view of the aerial vehicle 210.

As is shown in FIGS. 2A through 2D, the aerial vehicle 210 is configured for vertical-flight operations. The aerial vehicle 210 includes a fuselage 212, a pair of booms 214-1, 214-2, a pair of fins 216-1, 216-2, a wing 220 and a tail shroud 225. The fuselage 212 features a forward variable tilt motor assembly 230-1 disposed at a forward end and an aft variable tilt motor assembly 230-2 disposed at an aft end. The forward variable tilt motor assembly 230-1 and the aft variable tilt motor assembly 230-2 are rotatably coupled to a forward propeller (or rotor) 232-1 and an aft propeller (or rotor) 232-2, respectively, and configured to rotate the propellers 232-1, 232-2 about vertical axes, e.g., axes that are parallel to a vertical axis (or yaw axis) of the aerial vehicle 210. As is shown in FIGS. 2A through 2D, each of the forward variable tilt motor assembly 230-1 and the aft variable tilt motor assembly 230-2 is aligned in a tractor configuration, and is thus oriented to rotate the propellers 232-1, 232-2 about substantially vertical axes in order to provide forces of lift to the aerial vehicle 210.

Additionally, as is shown in FIGS. 2A through 2C, a landing gear rod 218 is joined to a front surface of the forward variable tilt motor assembly 230-1. The landing gear rod 218 and undersides of the fins 216-1, 216-2 provide a three-point, tripod-like system that enables the aerial vehicle 210 to land on or take off from substantially flat surfaces while limiting the extent of contact of the aerial vehicle 210 with such surfaces. For example, as is shown in FIG. 2C, a free end of the landing gear rod 218 and the undersides of the fins 216-1, 216-2 are aligned on a common plane. Additionally, the placement and orientation of the landing gear rod 218 with respect to the forward variable tilt motor assembly 230-1 ensures that the landing gear rod 218 is extended when the forward variable tilt motor assembly 230-1 is aligned substantially vertically, such as is shown in FIGS. 2A through 2D, and that the landing gear rod 218 is tucked beneath the fuselage 212 when the forward variable tilt motor assembly 230-1 is aligned substantially horizontally, e.g., for forward-flight operations, and the aerial vehicle 210 is not expected to land or take off.

The booms 214-1, 214-2 are mounted to undersides of the wing 220, on port and starboard sides of the fuselage 212, extending in parallel with the longitudinal axis of the aerial vehicle 210. The fins 216-1, 216-2 are of equal lengths and are mounted beneath the respective booms 214-1, 214-2. The fins 216-1, 216-2 may be fixed or movable in nature. Each of the fins 216-1, 216-2 includes a rudder 217-1, 217-2 at a respective trailing edge of the fins 216-1, 216-2. The rudders 217-1, 217-2 may be pivoted about an axis defined by the respective fins 216-1, 216-2 during forward-flight operations in order to change a heading of the aerial vehicle 210, or for any other purpose.

Additionally, the boom 214-1 includes a pair of propulsion motors 240-1, 240-3 having a pair of propellers (or rotors) 242-1, 242-3 rotatably coupled thereto, and the boom 214-2 includes a pair of propulsion motors 240-2, 240-4 having a pair of propellers (or rotors) 242-2, 242-4 rotatably coupled thereto. In some embodiments, the propulsion motors 240-1, 240-2, 240-3, 240-4 and/or the propellers 242-1, 242-2, 242-3, 242-4 may be housed within their respective booms 214-1, 214-2, such as is shown in FIGS. 2A through 2D, or disposed above, below or alongside the respective booms 214-1, 214-2, in accordance with the present disclosure. The boom 214-1 further includes imaging devices 250-1, 250-3 mounted at its forward and aft ends, respectively, while the boom 214-2 includes imaging devices 250-2, 250-4 mounted at its forward and aft ends, respectively. The imaging devices 250-1, 250-2 are configured to capture imaging data from respective fields of view extending forward of the aerial vehicle 210, and the imaging devices 250-3, 250-4 are configured to capture imaging data from respective fields of view extending aft of the aerial vehicle 210. The wing 220 further includes a pair of flaperons 222-2, 224-2 (or other control surfaces) provided on the port side of the fuselage 212 and a pair of flaperons 222-1, 224-1 (or other control surfaces) provided on the starboard side of the fuselage 212.

When the aerial vehicle 210 is configured for vertical-flight operations, or hovering, forces of lift are provided by not only the forward variable tilt motor assembly 230-1 and the aft variable tilt motor assembly 230-2 but also the propulsion motors 240-1, 240-2, 240-3, 240-4 provided within the booms 214-1, 214-2. In some embodiments, each of the motor assemblies 230-1, 230-2 and the propulsion motors 240-1, 240-2, 240-3, 240-4 may be configured to rotate propellers 232-1, 232-2, 242-1, 242-2, 242-3, 242-4 within a common plane, thereby effectively converting the aerial vehicle 210 into a six-rotor helicopter, with each of the six vertically aligned propellers 232-1, 232-2, 242-1, 242-2, 242-3, 242-4 providing redundancy and more precise altitude control in environments where the aerial vehicle 210 may be expected to encounter humans or other animals, as well as one or more structures, plant life or other aerial vehicles, e.g., during landing or takeoff operations, or when deploying or retrieving payloads.

Alternatively, in some other embodiments, the propulsion motors 240-1, 240-2, 240-3, 240-4 that are mounted within or in association with the booms 214-1, 214-2 may be aligned in a slightly inward orientation, e.g., at cant angles, toward the fuselage 212. In such embodiments, the propulsion motors 240-1, 240-2, 240-3, 240-4 and the propellers 242-1, 242-2, 242-3, 242-4 enable the aerial vehicle 210 to more readily respond to wind gusts having lateral components.

The propellers 232-1, 232-2, 242-1, 242-2, 242-3, 242-4 may have any dimensions. For example, in some embodiments, the propellers 232-1, 232-2, 242-1, 242-2, 242-3, 242-4 may have diameters of approximately seventeen inches (17"), or approximately 0.432 meters. Additionally, the propellers 232-1, 232-2, 242-1, 242-2, 242-3, 242-4 may feature any number of blades, e.g., two blades, such as is shown in FIGS. 2A through 2D, or any number of blades that is greater than two.

The tail shroud 225 is joined to trailing edges of the wing 220 on port and starboard sides of the fuselage 212, and to aft ends of each of the booms 214-1, 214-2. The tail shroud 225 acts as a protective barrier against lateral impacts and/or collisions, and remains between the propellers 232-1, 232-2, 242-1, 242-2, 242-3, 242-4 and any objects and/or structures regardless of the operating mode of the aerial vehicle 210. The tail shroud 225 may be formed from any suitable (e.g., sufficiently lightweight and durable) materials, including but not limited to one or more tubes or other similarly shaped or formed materials. For example, in some embodiments, the tail shroud 225 may be formed from one or more carbon composites. Alternatively, the tail shroud 225 may include frames or structures formed from one or more plastics, woods, metals or composites, including but not limited to materials such as carbon fiber, graphite, machined aluminum, titanium or fiberglass.

The forward variable tilt motor assembly 230-1 and the aft variable tilt motor assembly 230-2 may include any type or form of motor (e.g., electric, gasoline-powered or any other type of motor) capable of generating sufficient rotational speeds of one or more propellers or other components to provide lift and/or thrust forces to the aerial vehicle 210 and any engaged payload, and to aerially transport the engaged payload thereby. For example, one or more of the forward variable tilt motor assembly 230-1 and/or the aft variable tilt motor assembly 230-2 may include a brushless direct current (DC) motor such as an outrunner brushless motor or an inrunner brushless motor. Similarly, the propulsion motors 240-1, 240-2, 240-3, 240-4 may also be any type or form of motor, e.g., a brushless DC motor. Moreover, the forward variable tilt motor assembly 230-1, the aft variable tilt motor assembly 230-2 and/or one or more of the propulsion motors 240-1, 240-2, 240-3, 240-4 may be configured to operate with different capacities or ratings, or at different speeds, or coupled to propellers 232-1, 232-2, 242-1, 242-2, 242-3, 242-4 having different sizes and shapes. Furthermore, the propellers 232-1, 232-2, 242-1, 242-2, 242-3, 242-4 may be formed from any type or form of plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. In some implementations, the propellers 232-1, 232-2, 242-1, 242-2, 242-3, 242-4 may be formed of one or more lightweight materials including but not limited to carbon fiber, graphite, machined aluminum, titanium, fiberglass, wood or plastic.

The imaging devices 250-1, 250-2, 250-3, 250-4 may be any type or form of digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction. In some embodiments, the imaging devices 250-1, 250-2, 250-3, 250-4 may be any form of optical recording device that may be used to photograph or otherwise record imaging data during operation of the aerial vehicle 210, for any other purpose. The imaging devices 250-1, 250-2, 250-3, 250-4 may include one or more sensors, memory or storage components and processors, and such sensors, memory components or processors may further include one or more photosensitive surfaces, filters, chips, electrodes, clocks, boards, timers or any other relevant features (not shown). For example, such imaging devices 250-1, 250-2, 250-3, 250-4 may capture imaging data in the form of one or more still or moving images of any kind or form, as well as any relevant audio signals or other information, and may be connected with one or more control systems aboard the aerial vehicle 210 and/or one another by way of a wired or wireless connection that may be dedicated or comprise all or part of an internal network (not shown).

Alternatively, or in addition to the imaging devices 250-1, 250-2, 250-3, 250-4, the aerial vehicle 210 may also include one or more radar, laser or other sensors (e.g., LIDAR) that are configured to determine distances or ranges to objects along a given axis. The aerial vehicle 210 may further include one or more lights or other addressable illuminators, e.g., safety lights, running lights or normal operating lights, that may be selectively operated during operation of an aerial vehicle in order to project light of any color, frequency or wavelength in one or more directions. Such lights or other illuminators may be provided in fixed positions or orientations on the aerial vehicle 210, e.g., within or along one or more of the booms 214-1, 214-2, or in other locations on the fuselage 212, the wing 220, the tilt motor assemblies 230-1, 230-2, or any other aspect of the aerial vehicle 210.

As is discussed above, the aerial vehicles of the present disclosure may be configured to conduct forward-flight and vertical-flight operations, and to transition therebetween. Referring to FIGS. 3A through 3D, views of aspects of one multirotor aerial vehicle 310 in accordance with embodiments of the present disclosure are shown. Except where otherwise noted, reference numerals preceded by the number "3" shown in FIGS. 3A through 3D indicate components or features that are similar to components or features having reference numerals preceded by the number "2" shown in FIGS. 2A through 2D or by the number "1" shown in FIGS. 1A through 1F.

Figure 3A:
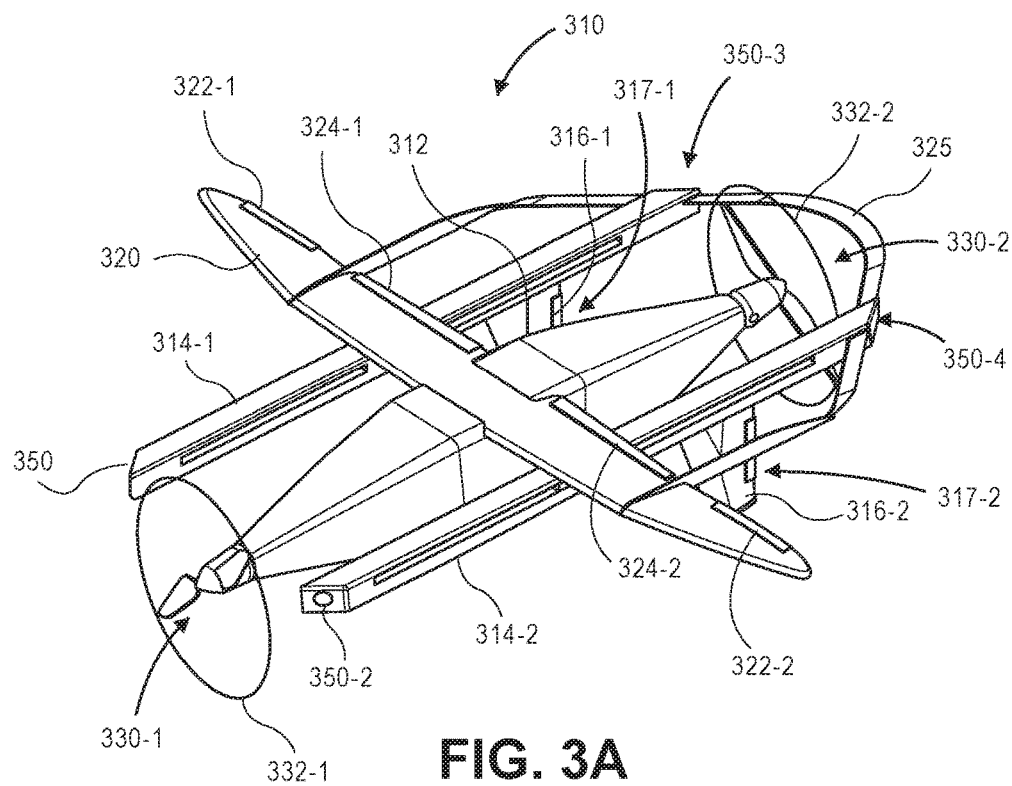
FIGS. 3A through 3D are views of aspects of one multirotor aerial vehicle in accordance with embodiments of the present disclosure.
Figure 3B:
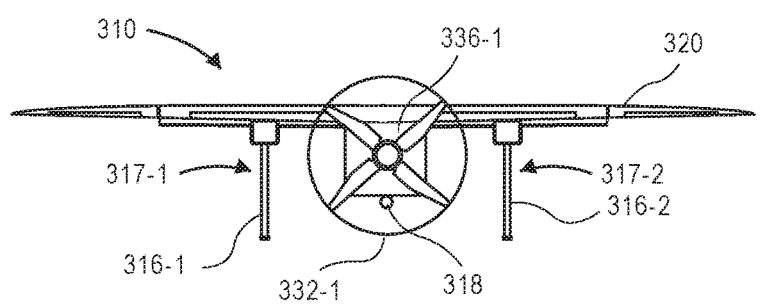
Figure 3C:
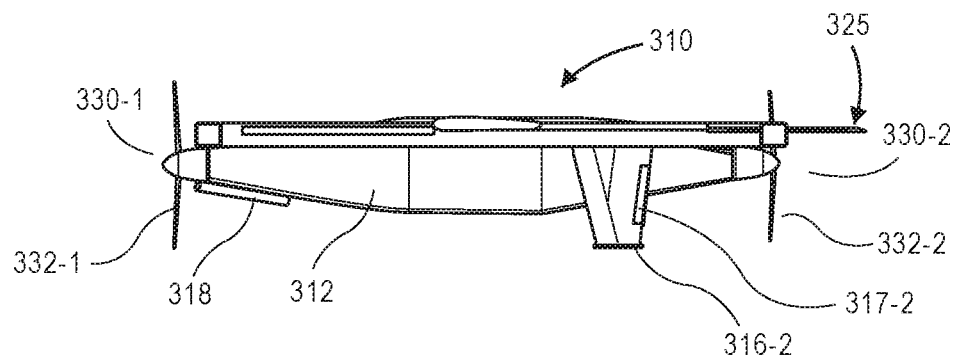
Figure 3D:
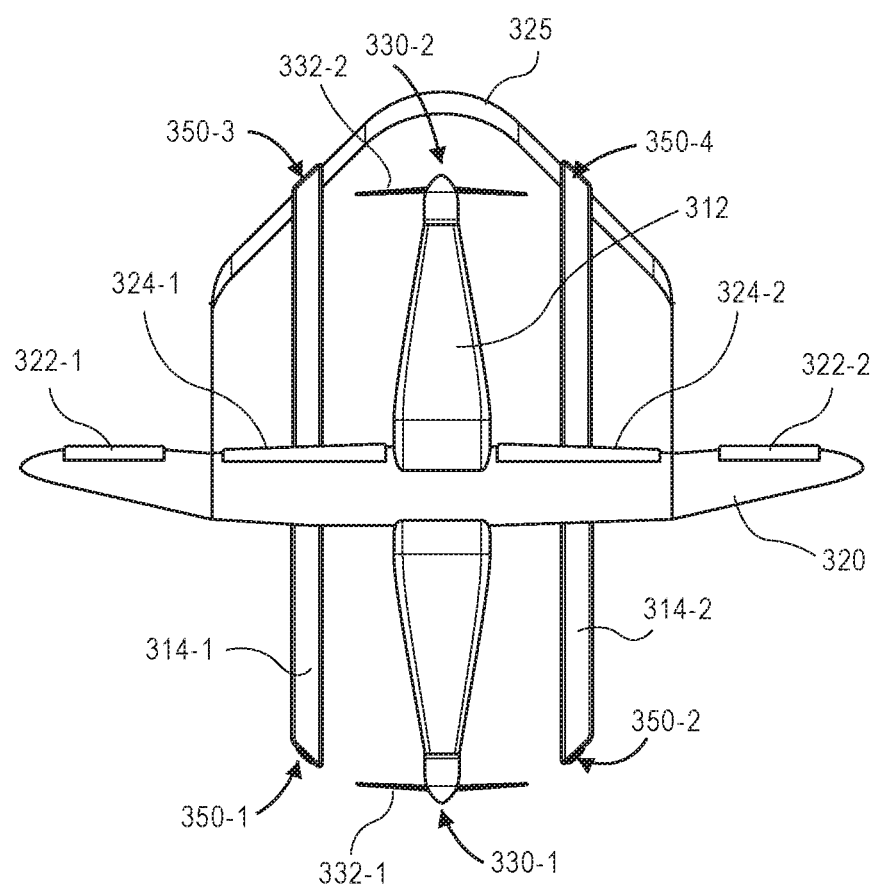

FIG. 3A is a perspective view of the aerial vehicle 310 configured for forward-flight operations. FIG. 3B is a front view of the aerial vehicle 310. FIG. 3C is a side view of the aerial vehicle 310. FIG. 3D is a top view of the aerial vehicle 310.

As is shown in FIGS. 3A through 3D, the aerial vehicle 310 is configured for forward-flight operations. The aerial vehicle 310 includes a fuselage 312, a pair of booms 314-1, 314-2, a pair of fins 316-1, 316-2, a wing 320 and a tail shroud 325. The fuselage 312 features a forward variable tilt motor assembly 330-1 disposed at a forward end and an aft variable tilt motor assembly 330-2 disposed at an aft end. The forward variable tilt motor assembly 330-1 and the aft variable tilt motor assembly 330-2 are rotatably coupled to a forward propeller 332-1 and an aft propeller 332-2, respectively.

The configuration of the variable tilt motor assemblies 330-1, 330-2 shown in FIGS. 3A through 3D provides the aerial vehicle 310 with sufficient forces of thrust for engaging in forward-flight operations. In most forward-flight operations, sufficient forces of lift for supporting the weight of the aerial vehicle 310 are generated by air flow over the wing 320, thereby enabling the propulsion motors mounted within the booms 314-1, 314-2 to be turned off, and the propellers rotatably coupled to the propulsion motors to remain housed therein.

The booms 314-1, 314-2 are mounted to undersides of the wing 320, on port and starboard sides of the fuselage 312, and extend in parallel with the longitudinal axis of the aerial vehicle 310. The fins 316-1, 316-2 are of equal lengths and are mounted beneath the respective booms 314-1, 314-2. The fins 316-1, 316-2 may be fixed or movable in nature. For example, the fins 316-1, 316-2 may be configured to pivot about a vertical axis (e.g., an axis perpendicular to the booms 314-1, 314-2), and to act as a rudder that causes a change in heading of the aerial vehicle 310 during forward-flight operations. A pair of propulsion motors (not shown) and rotors (not shown) are housed within the respective booms 314-1, 314-2. In some embodiments, the propulsion motors and/or the propellers may be disposed above, below or alongside the respective booms 314-1, 314-2, in accordance with the present disclosure. The wing 320 further includes a pair of flaperons 322-2, 324-2 (or other control surfaces) provided on the port side of the fuselage 312 and a pair of flaperons 322-1, 324-1 (or other control surfaces) provided on the starboard side of the fuselage 312. Each of the fins 316-1, 316-2 includes a rudder 317-1, 317-2 at a respective trailing edge of the fins 316-1, 316-2. The rudders 317-1, 317-2 may be pivoted about an axis defined by the respective fins 316-1, 316-2 during forward-flight operations in order to change a heading of the aerial vehicle 310, or for any other purpose.

Additionally, the boom 314-1 further includes imaging devices 350-1, 350-3 mounted at its forward and aft ends, respectively, while the boom 314-2 includes imaging devices 350-2, 350-4 mounted at its forward and aft ends, respectively. The imaging devices 350-1, 350-2 are configured to capture imaging data forward of the aerial vehicle 310, and the imaging devices 350-3, 350-4 are configured to capture imaging data aft of the aerial vehicle 310.

In accordance with the present disclosure, an aerial vehicle that is configured for vertical-flight operations, such as is shown in FIGS. 2A through 2D, may be reconfigured for forward-flight operations, such as is shown in FIGS. 3A through 3D, or vice versa. For example, when an aerial vehicle that is configured for vertical-flight operations, such as the aerial vehicle 210 as is shown in FIGS. 2A through 2D, the forward variable tilt motor assembly 230-1 and the aft variable tilt motor assembly 230-2 are aligned substantially vertically and are configured to provide forces of lift to the aerial vehicle 210, while the propulsion motors 240-1, 240-2, 240-3, 240-4 are operating and also providing forces of lift.

When the aerial vehicle 210 is programmed to transition from vertical-flight operations to forward-flight operations, the forward variable tilt motor assembly 230-1 begins to tilt forward as a function of its programmed or actual air speed, and the aft variable tilt motor assembly 230-2 remains in a substantially vertical alignment. After the forward variable tilt motor assembly 230-1 has been aligned substantially horizontally, the aft variable tilt motor assembly 230-2 begins to tilt backward and down, and to adjust the pitch of the blades of the aft propeller 232-2 in order to modify the aft variable tilt motor assembly 230-2 from a tractor configuration to a pusher configuration, and to reverse a direction of its thrust vector prior to reaching a substantially horizontal alignment. With the forward variable tilt motor assembly 230-1 and the aft variable tilt motor assembly 230-2 are providing sufficient forces of thrust, the propulsion motors 240-1, 240-2, 240-3, 240-4 may be turned off, and the propellers 242-1, 242-2, 242-3, 242-4 may be stowed within the booms 214-1, 214-2. The aerial vehicle 310 of FIGS. 3A through 3D is shown as configured for forward-flight operations, e.g., with the forward variable tilt motor assembly 330-1 and the aft variable tilt motor assembly 330-2 aligned to generate thrust in a forward direction. Alternatively, where the aerial vehicle 310 is programmed to transition from forward-flight operations to vertical-flight operations, a similar process may be followed in a reverse order, with the forward variable tilt motor assembly 330-1 and the aft variable tilt motor assembly 330-2 being rotated vertically upward, and the pitch of the blades of the propeller 332-2 being reversed.

As is discussed above, some embodiments of the aerial vehicles of the present disclosure are equipped with variable tilt motor assemblies that may provide forces of lift and/or thrust at various angles or in various directions, including not only forward (e.g., along a longitudinal axis of the aerial vehicles) but also vertical (e.g., along an axis parallel to a vertical or yaw axis of the aerial vehicles), or at any other angle or in any other direction.

Figure 4A:
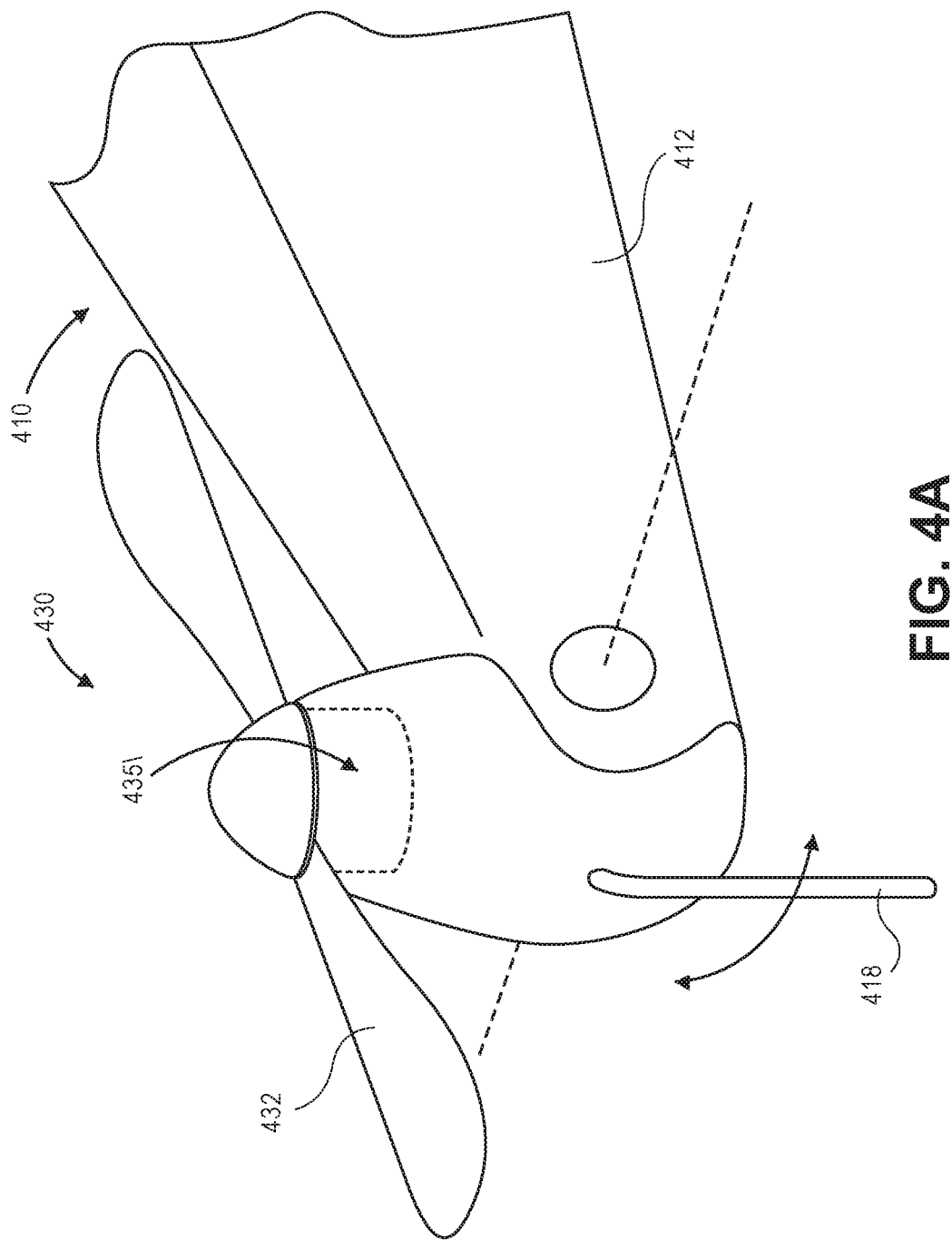
FIGS. 4A through 4C are views of aspects of one multirotor aerial vehicle in accordance with embodiments of the present disclosure.
Figure 4B:
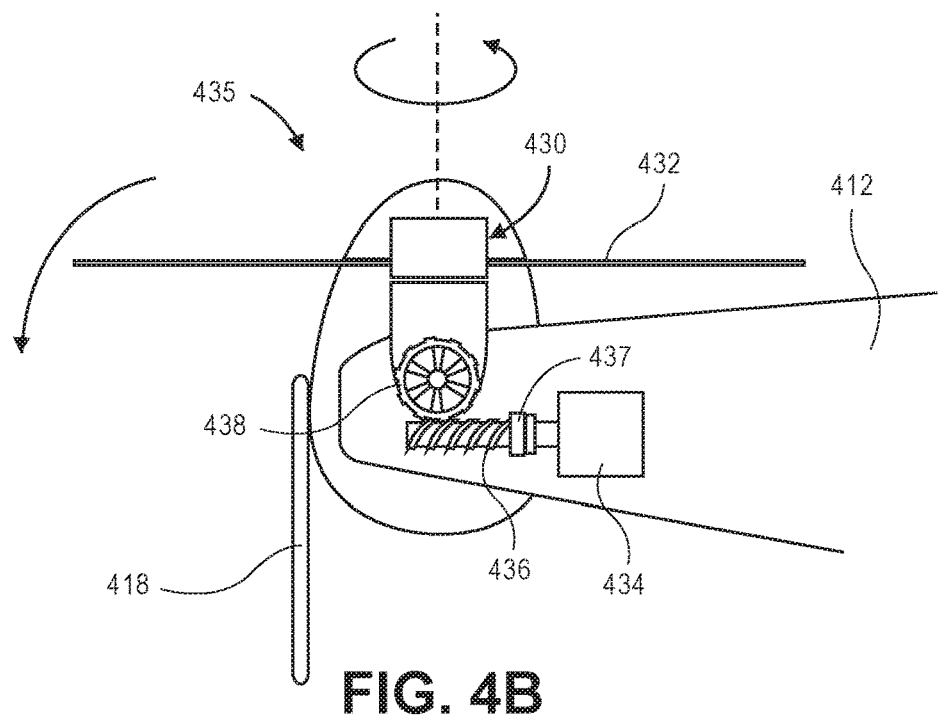
Figure 4C:
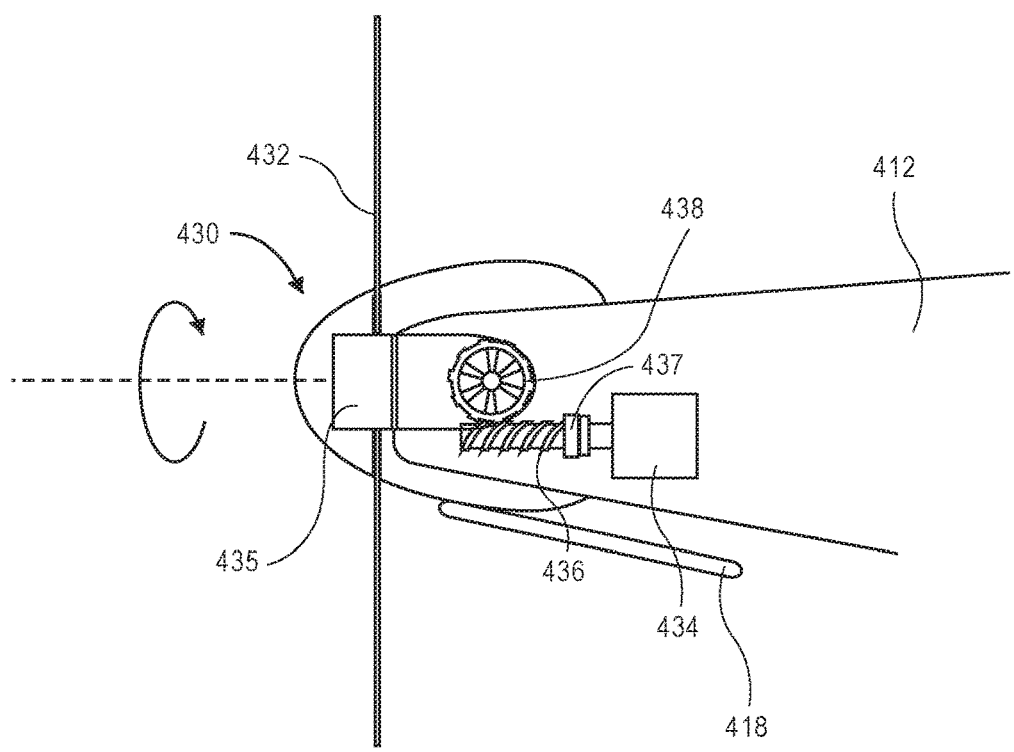

Referring to FIGS. 4A through 4C, views of aspects of one multirotor aerial vehicle in accordance with embodiments of the present disclosure are shown. Except where otherwise noted, reference numerals preceded by the number "4" shown in FIGS. 4A through 4C indicate components or features that are similar to components or features having reference numerals preceded by the number "3" shown in FIGS. 3A through 3D, by the number "2" shown in FIGS. 2A through 2D or by the number "1" shown in FIGS. 1A through 1F.

As is shown in FIG. 4A, a tilt motor assembly 430 includes a propulsion motor 435 coupled to a propeller 432, and is joined to a fuselage 412. Additionally, the tilt motor assembly 430 includes a landing gear rod 418 joined to an outer skin, fairing or other surface of the tilt motor assembly 430. The landing gear rod 418 is aligned in parallel, or nearly in parallel, with an axis of the propulsion motor 435, such that the landing gear rod 418 extends downward below the fuselage 412 when the propulsion motor 435 is configured to rotate the propeller 432 about a substantially vertical axis, e.g., during vertical-flight operations and/or hovering.

As is shown in FIGS. 4B and 4C, the tilt motor assembly 430 includes a servo 434, a worm drive 436, a thrust bearing 437 and a worm gear assembly 438 joined to the propulsion motor 435. The servo 434 is configured to rotate the worm drive 436 in a clockwise or counter-clockwise direction, as necessary, in response to one or more control signals. The worm drive 436 is meshed with the worm gear assembly 438 such that rotations of the worm drive 436 initiated by the servo 434 cause corresponding rotations of the worm gear 438. Thus, the servo 434 may cause a drive shaft of the propulsion motor 435 to be aligned for rotation about a vertical axis, a horizontal axis, or an axis at any non-vertical or non-horizontal angle. The thrust bearing 437 is configured to absorb any thrust in a direction along an axis of the worm drive 436, thereby protecting the servo 434 against any adverse effects of such force.

In accordance with the present disclosure, the tilt motor assembly 430 is typically configured for alignment in one of two orientations with respect to the fuselage 412. As is shown in FIG. 4B, the tilt motor assembly 430 may be configured for vertical-flight operation (or hovering) with the propulsion motor 435 aligned substantially vertically. In the orientation of the tilt motor assembly 430 shown in FIG. 4B, the landing gear rod 418 is also oriented substantially vertically, to provide structural support to the aerial vehicle 410 during landing and/or take off operations. As is shown in FIG. 4C, the tilt motor assembly 430 may be configured for forward-flight operation with the propulsion motor 435 aligned substantially horizontally. In the orientation of the tilt motor assembly 430 shown in FIG. 4C, the landing gear rod 418 is aligned adjacent to the fuselage 412 to reduce drag during forward flight. Additionally, because the landing gear rod 418 is joined to the tilt motor assembly 430, such as is shown in FIGS. 4A through 4C, a single servo, e.g., the servo 434, may be used to not only orient the tilt motor assembly 430 in a desired orientation but also to deploy the landing gear rod 418 when needed.

The propulsion motor 435, the propeller 432 and/or the servo 434 may be connected to one or more control systems by wired or wireless means. Additionally, the tilt motor assembly 430 may include one or more additional components, other than the components shown in FIGS. 4A through 4C, including but not limited to one or more additional bearings other than the thrust bearing 437. Additionally, the tilt motor assembly 430 may be provided at a forward end of the fuselage 412 or at an aft end of the fuselage 412. Moreover, in some embodiments, where an aerial vehicle includes a pair of tilt motor assemblies provided at forward and aft ends of a fuselage, a failure of one of the tilt motor assemblies need not compromise the flight capability of the aerial vehicle, due to the redundancy associated with the use of two tilt motor assemblies. Depending on the capacities of the propulsion motor 435 and/or one or more dimensions or other attributes of the propeller 432, the aerial vehicle 410 may be operated in forward flight with only one tilt motor assembly (e.g., either a forward tilt motor assembly or an aft tilt motor assembly) provided in a forward-flight orientation.

Moreover, the tilt motor assembly 430 of FIGS. 4A through 4C may further include any number of additional components that permit the pitch angles of the propeller 432 to be varied as the orientation of the tilt motor assembly 430 is varied, and to modify a direction of a thrust vector generated thereby accordingly. For example, the tilt motor assembly 430 may include one or more linkages, output shafts for varying the pitch angles, synchronization shafts, gearboxes, and other features for varying the pitch angles of the propeller 432, or for reversing a direction of rotation of the propeller 432.

Figure 5:
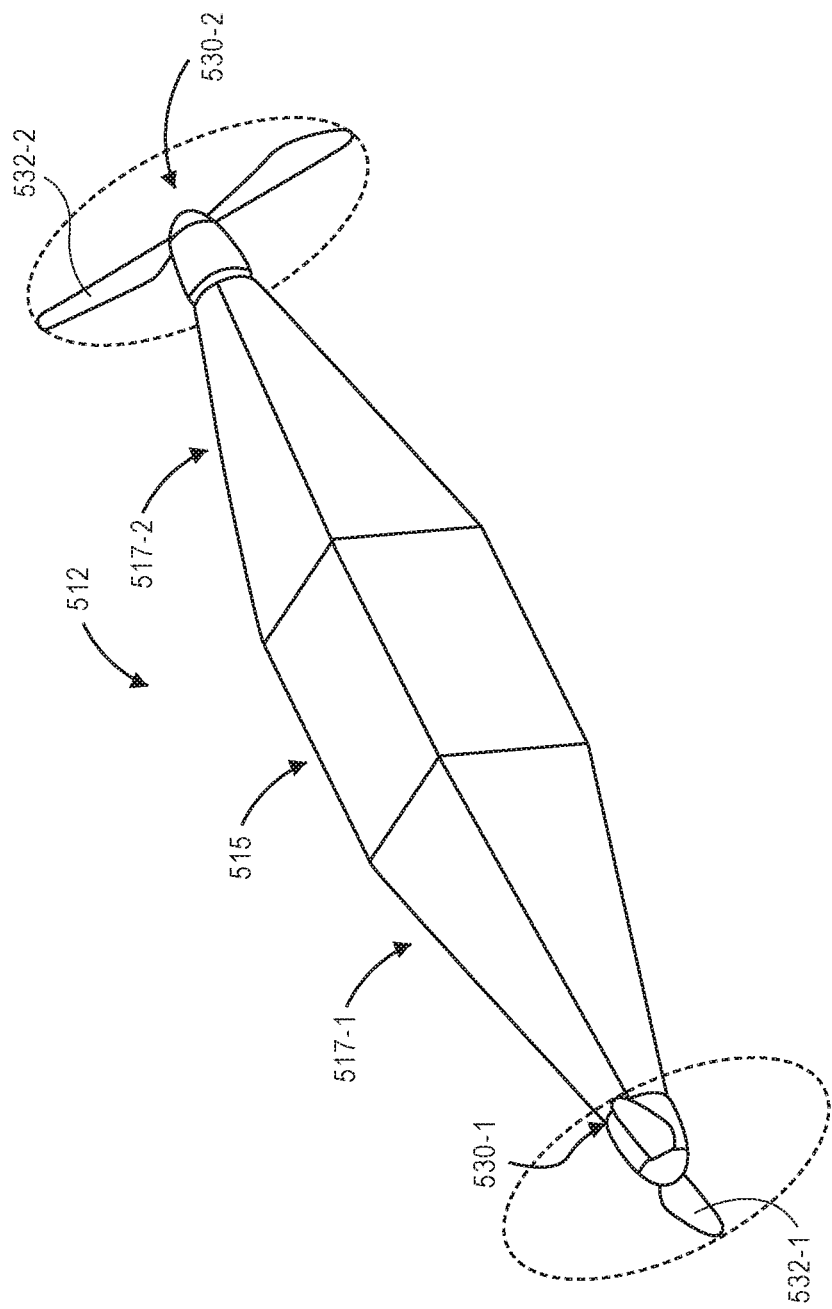
FIG. 5 is a view of aspects of one multirotor aerial vehicle in accordance with embodiments of the present disclosure.

Referring to FIG. 5, a view of aspects of one multirotor aerial vehicle in accordance with embodiments of the present disclosure is shown. Except where otherwise noted, reference numerals preceded by the number "5" shown in FIG. 5 indicate components or features that are similar to components or features having reference numerals preceded by the number "4" shown in FIGS. 4A through 4C, by the number "3" shown in FIGS. 3A through 3D, by the number "2" shown in FIGS. 2A through 2D or by the number "1" shown in FIGS. 1A through 1F.

As is shown in FIG. 5, a fuselage 512 includes a central structure 515, a forward narrowing section 517-1 and an aft narrowing section 517-2. The central structure 515 of the fuselage 512 has a shape of a box-like (e.g., substantially rectangular) structure that may be configured to accommodate one or more payload engagement systems, power supplies, control systems or other features therein. The central structure 515 of the fuselage 512 may be configured for mounting to a single wing, such as on an upper surface thereof, or to two discrete wings, e.g., a port wing and a starboard wing.

The forward narrowing section 517-1 includes a forward tilt motor assembly 530-1 having a forward propeller 532-1 rotatably coupled thereto. The aft narrowing section 517-2 includes an aft tilt motor assembly 530-2 having an aft propeller 532-2 rotatably coupled thereto. As is shown in FIG. 5, the narrowing sections 517-1, 517-2 of the fuselage 512 extend symmetrically forward and aft of the central structure 515 of the fuselage 512 (e.g., on opposite sides of the box-like structure), and the forward tilt motor assembly 530-1 and the aft tilt motor assembly 530-2 are joined to the forward and aft ends of the narrowing sections 517-1, 517-2, respectively. Although the narrowing sections 517-1, 517-2 of the fuselage 512 are shown as having the shapes of pyramids, those of ordinary skill in the pertinent arts will recognize that such narrowing sections 517-1, 517-2 may take any shape, such as cones.

In some embodiments, the central structure 515 may take the form of a modified box structure that is configured to accommodate payloads having dimensions of approximately eight inches by eight inches by twelve inches (8"×8"×12") and a mass of approximately five pounds (5 lbs.), or approximately two-and-one-quarter kilograms (2.25 kg). The fuselage 512 may also be configured to accommodate power supplies and/or control system components forward and aft of a center of the fuselage 512, with such supplies and/or components having masses of four to five pounds (4-5 lbs.), or approximately two to two-and-one-quarter kilograms (2-2.5 kg). Additionally, the fuselage 512 may be formed from any suitable (e.g., sufficiently lightweight and durable) materials. In some embodiments, the fuselage 512 may be formed from one or more carbon composites. Alternatively, the fuselage 512 may include frames or structures formed from one or more plastics, woods, metals or composites, including but not limited to materials such as carbon fiber, graphite, machined aluminum, titanium or fiberglass.

Figure 6:
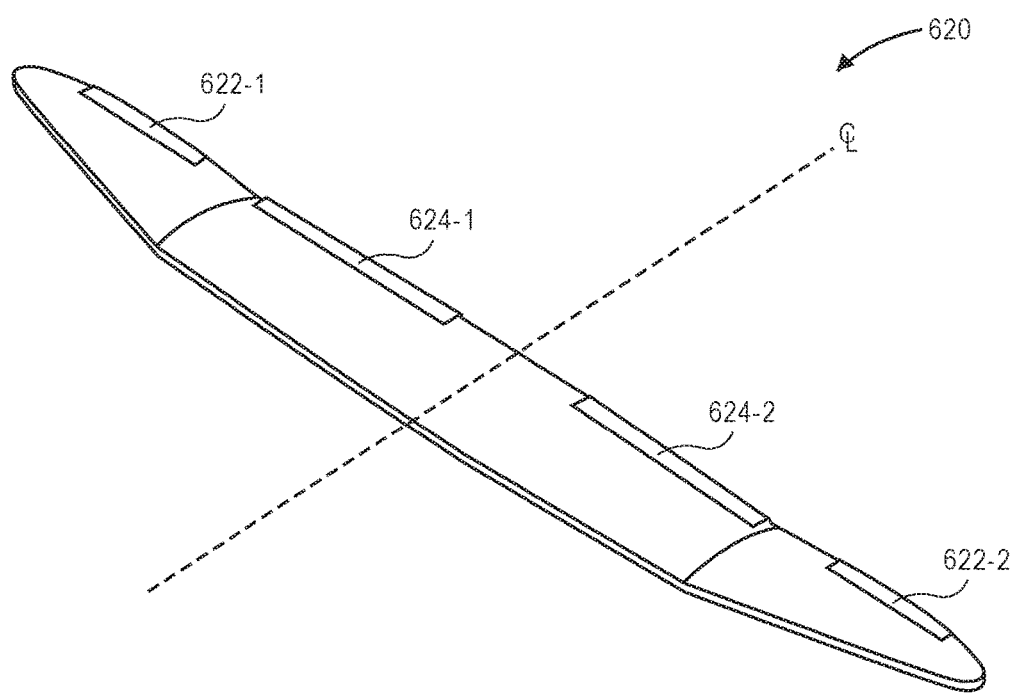
FIG. 6 is a view of aspects of one multirotor aerial vehicle in accordance with embodiments of the present disclosure.

Referring to FIG. 6, a view of aspects of one multirotor aerial vehicle in accordance with embodiments of the present disclosure is shown. Except where otherwise noted, reference numerals preceded by the number "6" shown in FIG. 6 indicate components or features that are similar to components or features having reference numerals preceded by the number "5" shown in FIG. 5 by the number "4" shown in FIGS. 4A through 4C, by the number "3" shown in FIGS. 3A through 3D, by the number "2" shown in FIGS. 2A through 2D or by the number "1" shown in FIGS. 1A through 1F.

As is shown in FIG. 6, a wing 620 includes a pair of flaperons (or other control surfaces) 622-2, 624-2 provided on a port side of the wing 620 with respect to a centerline and a pair of flaperons 622-1, 624-1 provided on a starboard side of the wing 620. The wing 620 is configured for mounting to a fuselage, such as the fuselage 512 of FIG. 5, about a central root section along the centerline of the wing 620, such that the centerline of the wing 620 is aligned above and in parallel with a longitudinal axis of the fuselage. The flaperons 622-1, 624-1, 622-2, 624-2 may further include one or more servos, motors or other linkages disposed within the wing 620, and may be configured to receive one or more instructions from one or more control systems. The flaperons 622-1, 622-2, 624-1, 624-2 may be sized to provide any amount or extent of lift control to the aerial vehicle 610, and including two or more of the flaperons 622-1, 622-2, 624-1, 624-2 on either side of the centerline enhances the operability of the aerial vehicle 610 in the event of a failure of any one of the flaperons 622-1, 622-2, 624-1, 624-2. Moreover, and in addition to the flaperons 622-1, 622-2, 624-1, 624-2, the wing 620 may include any number of additional control surfaces (not shown) including but not limited to elevators, elevons, rudders, ailerons, flaps, brakes or slats, which may be fixed or movable in nature.

The wing 620 may be formed from a single unit fixed to an upper surface of a fuselage, such as the fuselage 512 of FIG. 5, or as a pair of discrete wings (e.g., port and starboard wings) that are joined to the fuselage at a single spar joint at a central root section. The wing 620 may be formed from any suitable (e.g., sufficiently lightweight and durable) materials. In some embodiments, the wing 620 may be formed from one or more carbon composites. Alternatively, the wing 620 may include frames or structures formed from one or more plastics, woods, metals or composites, including but not limited to materials such as carbon fiber, graphite, machined aluminum, titanium or fiberglass. In some embodiments, the wing 620 may be formed in a carbon spar and boom arrangement, such as with one or more ribs or a foam core, and a carbon or glass cloth skin.

As is discussed above, the wing 620 may have a substantially high aspect ratio. In some embodiments, the wing 620 may have a span of approximately 1.937 meters (2 m), and a wing area of approximately 0.279 square meters, and an aspect ratio of approximately 13.458. As is also discussed above, the wing 620 has a zero or low (e.g., near-zero) dihedral angle. Alternatively, the wing 620 may have any positive dihedral angle, or an anhedral angle, in accordance with the present disclosure.

In accordance with embodiments of the present disclosure, symmetrically arranging the tilt motor assemblies and the propulsion motors within the booms with respect to the wing, and the placement of power supplies, control systems or other components within the fuselage, ensures that a center of gravity of the aerial vehicle is within a substantially fixed location regardless of whether the aerial vehicle is configured for forward-flight or vertical-flight operations. Payload engagement systems may be provided at or near an aerodynamic center of the aerial vehicle, thereby enabling the aerial vehicle to remain at a constant attitude as the aerial vehicle retrieves a payload at an origin, while the aerial vehicle is carrying a payload, or as the aerial vehicle deposits a payload at a destination.

Figure 7:
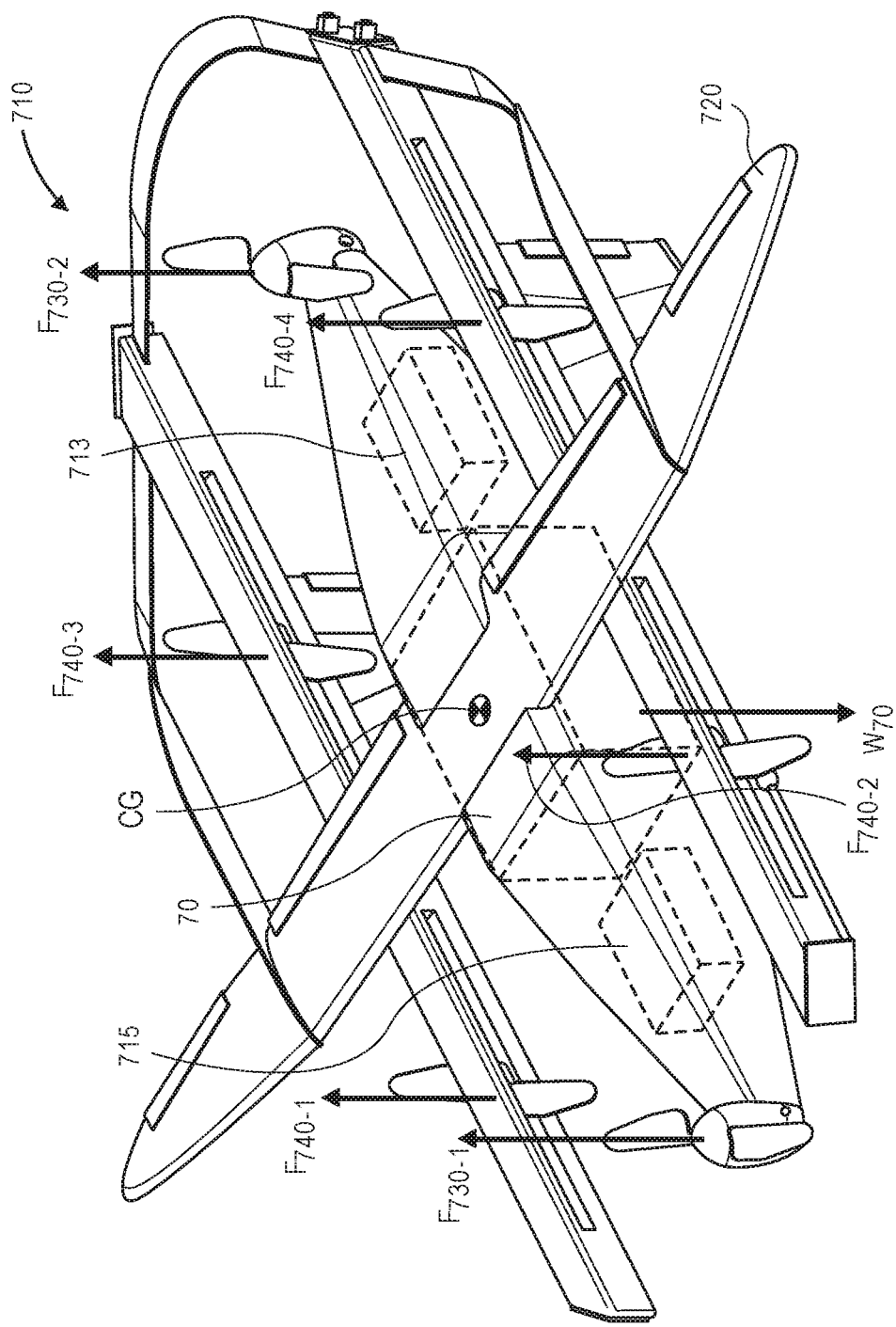
FIG. 7 is a view of aspects of one multirotor aerial vehicle in accordance with embodiments of the present disclosure.

Referring to FIG. 7, a view of aspects of one multirotor aerial vehicle in accordance with embodiments of the present disclosure is shown. Except where otherwise noted, reference numerals preceded by the number "7" shown in FIG. 7 indicate components or features that are similar to components or features having reference numerals preceded by the number "6" shown in FIG. 6, by the number "5" shown in FIG. 5 by the number "4" shown in FIGS. 4A through 4C, by the number "3" shown in FIGS. 3A through 3D, by the number "2" shown in FIGS. 2A through 2D or by the number "1" shown in FIGS. 1A through 1F.

As is shown in FIG. 7, an aerial vehicle 710 includes a fuselage 712, a pair of booms 714-1, 714-2 provided on starboard and port sides of the fuselage 712 and a wing 720. The fuselage 712 includes a forward tilt motor assembly 730-1 and an aft tilt motor assembly 730-2 disposed at forward and aft ends, respectively, of the fuselage 712. Within the fuselage 712, a power supply 715 (e.g., one or more batteries or other power cells such as lead-acid batteries, lithium ion batteries, nickel cadmium batteries or nickel metal hydride batteries, as well as fuel cells or solar cells) is mounted forward of the wing 720, while components of a control system 713 (e.g., processors, transceivers, data stores or other memory components) are mounted aft of the wing 720. A payload 70 (e.g., an item to be delivered from an origin to a destination) is releasably disposed within the fuselage 712.

Additionally, the boom 714-1 is mounted beneath the wing 720 on a starboard side of the fuselage 712 and includes a pair of propulsion motors 740-1, 740-3 housed therein. Alternatively, the propulsion motors 740-1, 740-3 may be mounted above, below or alongside the boom 714-1. Each of the propulsion motors 740-1, 740-3 is configured to rotate a propeller 742-1, 742-3 about a vertical axis, or a nearly vertical axis, e.g., at a slight inward cant toward the fuselage 712. The boom 714-2 is mounted beneath the wing 720 on a port side of the fuselage 712 and includes a pair of propulsion motors 740-2, 740-4 housed therein. Alternatively, the propulsion motors 740-2, 740-4 may be mounted above, below or alongside the boom 714-2. Each of the propulsion motors 740-2, 740-4 is configured to rotate a propeller 742-2, 742-4 about a vertical axis, or a nearly vertical axis, e.g., at a slight inward cant toward the fuselage 712.

The aerial vehicle 710 shown in FIG. 7 is configured for vertical-flight (or hovering) operations. For example, as is shown in FIG. 7, each of the forward tilt motor assembly 730-1 and the aft tilt motor assembly 730-2 is aligned substantially vertically and operates in a tractor configuration, generating forces of lift $F_{730-1}$, $F_{730-2}$ during operation. Each of the propulsion motors 740-1, 740-2, 740-3, 740-4 further generates forces of lift $F_{740-1}$, $F_{740-2}$, $F_{740-3}$, $F_{740-4}$ during operation.

A center of gravity CG of the aerial vehicle 710 may be centrally placed with respect to the fuselage 712 by evenly distributing masses of components of the aerial vehicle 710 forward and aft, and port and starboard, of a geometric center of the fuselage 712. For example, as is shown in FIG. 7, the masses of the power supply 715, the control system components 713, the forward tilt motor assembly 730-1 and the aft tilt motor assembly 730-2 are evenly distributed forward and aft with respect to the fuselage 712, such that the weights of the tilt motor assemblies 730-1, 730-2 cause a center of gravity CG of the aerial vehicle 710 to remain in a substantially central location along a longitudinal axis of the aerial vehicle 710 with respect to the fuselage 712. Moreover, the propulsion motors 740-1, 740-2, 740-3, 740-4 are evenly disposed within or in association with the booms 714-1, 714-2, forward and aft of the center of gravity CG of the aerial vehicle 710. For example, the propulsion motors 740-1, 740-2 are each provided at an equal distance forward of the center of gravity CG, while each of the propulsion motors 740-3, 740-4 is provided at the same distance aft of the center of gravity CG. In some embodiments, the booms 714-1, 714-2 may each include a single propulsion motor aligned with respect to the center of gravity CG. In some other embodiments, each of the booms 714-1, 714-2 may include numbers of propulsion motors greater than two (e.g., three or more), with the propulsion motors aligned equidistant and symmetrical with the center of gravity CG.

Similarly, the booms 714-1, 714-2 and the propulsion motors 740-1, 740-2, 740-3, 740-4 are also evenly distributed port and starboard with respect to the fuselage 712, such that the weights of the booms 714-1, 714-2 and the propulsion motors 740-1, 740-2, 740-3, 740-4 cause the center of gravity CG of the aerial vehicle 710 to remain in a substantially central location with respect to the fuselage 712. Additionally, cables and/or connectors extending between any control surfaces, imaging devices or other sensors, or other components and the control system 713 may also be evenly distributed on port and starboard sides of the fuselage 712, or forward and aft of the center of gravity CG, as necessary.

Therefore, by symmetrically placing the booms 714-1, 714-2 on the port and starboard sides of the fuselage 712, and by symmetrically disposing the forward tilt motor assembly 730-1 and the aft tilt motor assembly 730-2, and the propulsion motors 740-1, 740-2, 740-3, 740-4 associated therewith, equidistant from a center of the fuselage 712, a payload 70 and any associated engagement systems may be disposed within the fuselage 712, along with power supplies, control system components or the like, at or near the center of gravity CG of the aerial vehicle 710. With a weight $w_{70}$ of the payload 70 and/or the engagement systems disposed at or near the center of gravity CG, the payload 70 may be engaged, carried and/or released without adversely affecting the attitude of the aerial vehicle 710. Moreover, forces of lift $F_{730-1}$, $F_{730-2}$, $F_{740-1}$, $F_{740-2}$, $F_{740-3}$, $F_{740-4}$ may be generated or varied by the tilt motor assemblies 730-1, 730-2 and the propulsion motors 740-1, 740-2, 740-3, 740-4, as necessary, based on the weight $w_{70}$ of the payload 70 disposed within the fuselage 712, also without affecting the attitude of the aerial vehicle 710.

Additionally, symmetrically placing the booms 714-1, 714-2, the forward tilt motor assembly 730-1 and the aft tilt motor assembly 730-2, the propulsion motors 740-1, 740-2, 740-3, 740-4 and other components with respect to the fuselage 712 further ensures that the aerial vehicle 710 will remain in balance during vertical-flight operations, such as is shown in FIG. 7, and also during forward-flight operations. Where the forward airspeed of the aerial vehicle 710 is sufficient, one or more of the forces of lift $F_{730-1}$, $F_{730-2}$, $F_{740-1}$, $F_{740-2}$, $F_{740-3}$, $F_{740-4}$ shown in FIG. 7 may be replaced by forces of lift generated by the port and starboard sides of the wing 720 on the port and starboard sides of the fuselage 712, to provide support for the weight $w_{70}$ of the payload 70, and the aerial vehicle 710 may transport the payload 70 over distances of several miles or kilometers. If the forces of lift generated by the wing 720 are not sufficient or require temporary or extended augmentation, operations of one or more of the propulsion motors 740-1, 740-2, 740-3, 740-4 associated with the booms 714-1, 714-2 may be initiated or stopped on an as-needed basis.

In some embodiments, the various components of the aerial vehicles disclosed herein may be modular in nature, thereby ensuring that an aerial vehicle may be assembled and/or serviced in a simple manner. For example, the tail shrouds and/or wing sections may be removable from the fuselages and/or booms to enable servicing, repairs or replacement to one or more of the motors or motor assembly components, or propellers, on a regularly scheduled or an as-needed basis. Moreover, the propulsion motors within the tilt motor assemblies and/or the booms may be installed or replaced based on mission requirements of the aerial vehicles. Likewise, the power supplies and/or control system components may also be serviced, repaired or replaced, as necessary.

Figure 8:
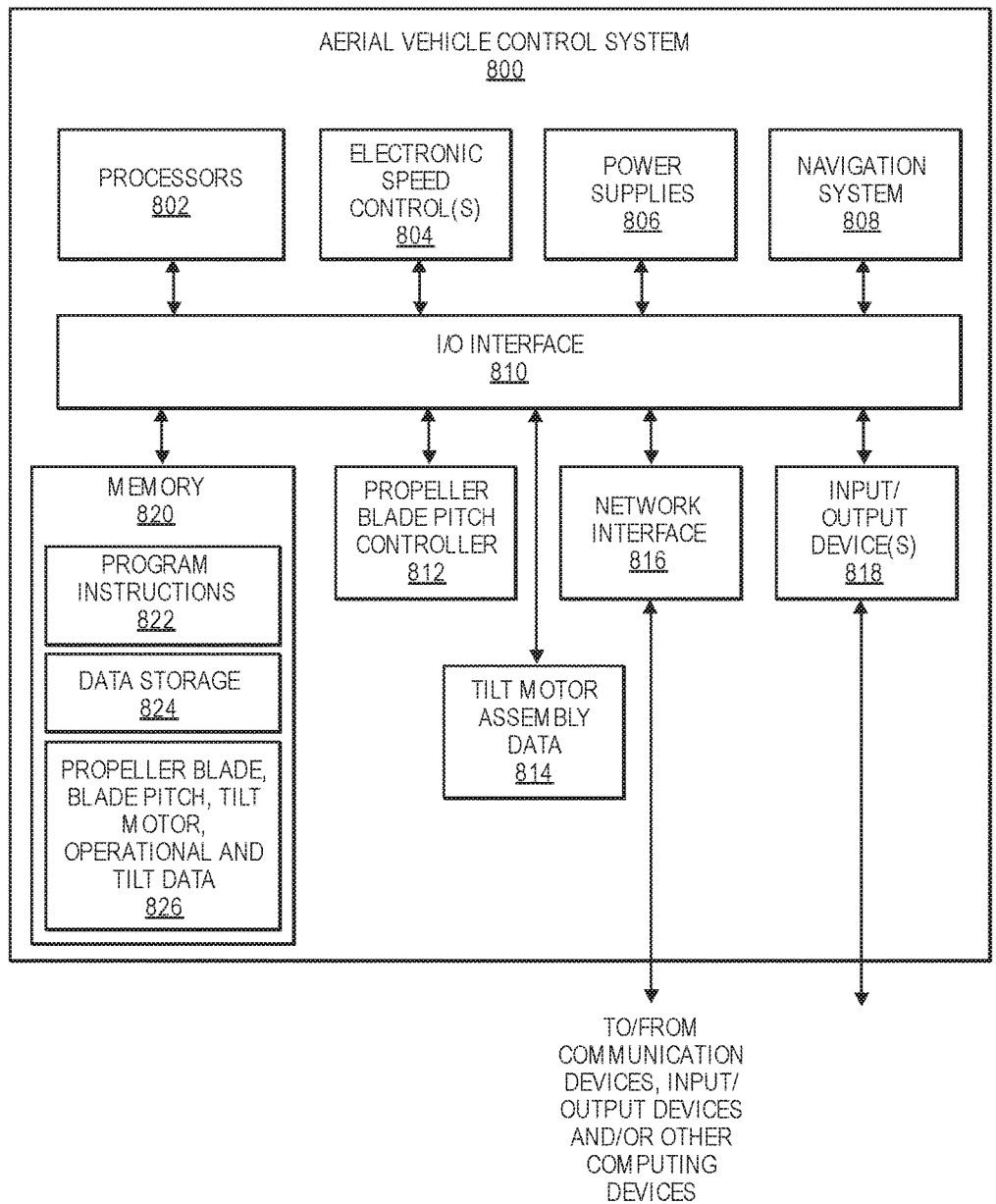
FIG. 8 is a block diagram of one control system for a multirotor aerial vehicle in accordance with embodiments of the present disclosure.

Referring to FIG. 8, a block diagram of one control system for a multirotor aerial vehicle in accordance with embodiments of the present disclosure is shown. In various examples, the block diagram of FIG. 8 may be illustrative of one or more aspects of the aerial vehicle control system 800 that may be used to implement the various systems and processes discussed herein.

As is shown in FIG. 8, the control system 800 includes one or more processors 802 that are coupled to one or more memory components (e.g., a non-transitory computer-readable medium) 820 via an input/output (I/O) interface 810. The control system 800 also includes one or more electronic speed controls (ESC) or propulsion controllers 804, a power controller or power supply module 806 and/or a navigation system 808. The control system 800 further includes a propeller blade pitch controller 812, a tilt motor assembly controller 814, a network interface 816, and one or more input/output devices 818.

The control system 800 may be a uniprocessor system including a single processor 802, or a multiprocessor system including several processors 802 (e.g., two, four, eight, or another suitable number of processors). The processors 802 may be any suitable processor capable of executing instructions. For example, in some embodiments, one or more of the processors 802 may be general-purpose or embedded processors implementing any of a variety of instruction set architectures (ISAs), such as the x86, PowerPC, SPARC, or MIPS ISAs, or any other suitable ISA. In multiprocessor systems, one or more of the processors 802 may, but not necessarily, implement the same ISA.

The memory components 820 may be configured to store executable instructions, data, propeller blade data or characteristics, blade pitch data or characteristics, propeller blade pitch adjustment apparatus data or characteristics, or any other instructions, data or characteristics associated with operation of an aerial vehicle, as well as any other data items accessible by the processor(s) 802. In various embodiments, the memory components 820 may be implemented using any suitable memory technology, such as static random access memory (SRAM), synchronous dynamic RAM (SDRAM), non-volatile or Flash-type memory, or any other type of memory. As is shown in FIG. 8, program instructions and data implementing desired functions, such as those described above, are shown stored within the memory components 820 as program instructions 822, data storage 824 and operational data 826 relating to propeller blades, blade pitches, tilt motor operation, and other operational data, respectively. In other embodiments, program instructions, data and/or operational data may be received, sent or stored upon different types of computer-accessible media, such as non-transitory media, or on similar media separate from the memory components 820 or the control system 800. The information or data stored within the memory components 820, e.g., the program instructions 822, the stored data 824 and the operational data 826, may include data related to the operation of propulsion motors, servos, worm gears, worm drives, control surfaces or any other aspect of the operation of components of an aerial vehicle described herein.

In some embodiments, the memory components 820 may include storage media or memory media such as magnetic or optical media, e.g., disk or CD/DVD-ROM, coupled to the control system 800 via the I/O interface 810. Program instructions and data stored via the memory components 820 may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processors 802, the memory components 820, and any peripheral devices, the network interface 816 or other peripheral interfaces, such as input/output devices 818. In some implementations, the I/O interface 810 may perform any necessary protocol, timing or other data transformations to convert data signals from one component (e.g., one or more of the memory components 820) into a format suitable for use by another component (e.g., processors 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the functions of the I/O interface 810 may be split into two or more separate components, e.g., a north bridge and a south bridge. Also, in some implementations, some or all of the functionality of the I/O interface 810, such as an interface to the memory components 820, may be incorporated directly into the processors 802.

The electronic speed controls or propulsion controllers 804 may communicate with the navigation system 808 and adjust the operational characteristics of one or more propulsion mechanisms (e.g., a tilt motor assembly and/or a propulsion motor) or control mechanisms (e.g., one or more control surfaces) to guide an aerial vehicle along a determined flight path and/or to perform other navigational maneuvers. The navigation system 808 may include a Global Positioning System receiver or other similar component than can be used to navigate an aerial vehicle to and/or from a location.

The control system 800 may also include a propeller blade pitch controller 812, which may be configured to communicate with components of an aerial vehicle, as discussed above, and to control the pitch angles of propellers coupled to tilt motor assemblies, or to propulsion motors associated with one or more booms. For example, the control system 800 may cause one or more motors or motor assemblies to operate in a first rotational direction to generate thrust by a corresponding propeller, in response to one or more control signals. In the event that a thrust reversal is desired, e.g., when the aft tilt motor assembly 130-2 transitions from forward-flight operations to vertical-flight operations, such as is shown in FIGS. 1A through 1F, the propeller blade pitch controller 812 may cause one or more gears, carriers, adjustment shafts and/or control shafts to adjust the pitches of the blades of the propeller (e.g., the aft propeller 132-2), such as to rotate the blades by approximately 180 degrees (180°), in response to one or more control signals. The control system 800 may also cause the one or more motors or motor assemblies to rotate in a second rotational direction opposite to that of the first rotational direction.

The control system 800 may also include one or more tilt motor assembly controllers 814 that are configured to interact with one or more components for repositioning tilt motor assemblies, e.g., the forward tilt motor assembly 130-1 and the aft tilt motor assembly 130-2 of FIGS. 1A through 1F, between forward-flight and vertical-flight orientations. Such components may include, but are not limited to, servos, worm drives, worm gear assemblies, thrust bearings or the like. For example, the control system 800 may cause one or more motors or motor assemblies to operate in a vertical or substantially vertical orientation, and also in a horizontal or substantially horizontal orientation, in response to one or more control signals.

The control system 800 may further include one or more network interfaces 816 that are configured to allow data to be exchanged between the control system 800, other devices attached to a network, such as other computer systems, aerial vehicle control systems of other aerial vehicles, and/or an aerial vehicle management system. For example, the network interface 816 may enable wireless communication between numerous aerial vehicles. In various implementations, the network interface 816 may support communication via wireless general data networks, such as a Wireless Fidelity (or "Wi-Fi") network. The network interface 816 may also support communication via telecommunications networks such as cellular communication networks, satellite networks, and the like.

The control system 800 may also include one or more input/output devices 818, e.g., one or more displays, image capture devices, imaging devices, thermal sensors, infrared sensors, time of flight sensors, accelerometers, pressure sensors, weather sensors, or the like. For example, the input/output devices 818 may include one or more of the cameras 150-1, 150-2, 150-3, 150-4 shown in FIGS. 1A through 1F. Any number of input/output devices 818 may be provided aboard an aerial vehicle and controlled by the control system 800. For example, one or more of such sensors may be utilized to determine an aerial vehicle operation, a flight condition, a location, and/or a time at which a change of pitch is desired for one or more propellers of the aerial vehicle.

As is shown in FIG. 8, the memory components 820 may include program instructions 822 which may be configured to implement the example processes and/or sub-processes described above. The data storage 824 and propeller blade, blade pitch, tilt motor and operational data 826 may include various data stores for maintaining data items that may be provided for controlling the actuation of the various propeller blade pitch adjustment apparatuses described herein to adjust pitches of propeller blades.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

As used herein, the terms "forward" flight or "horizontal" flight refer to flight in a direction substantially parallel to the ground (i.e., constant altitude with respect to sea level). As used herein, the term "vertical" flight refers to flight in a direction extending substantially radially outward from a center of the Earth, or hovering at a stationary altitude with an insubstantial change in horizontal or lateral position. Those of ordinary skill in the pertinent arts will recognize that flight trajectories may include components of both "forward" flight or "horizontal" flight and "vertical" flight vectors.

Although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
   a fuselage having a forward end and an aft end;
   a wing mounted to an upper surface of the fuselage, wherein the wing is mounted substantially between the forward end of the fuselage and the aft end of the fuselage;
   a forward tilt motor assembly disposed at the forward end of the fuselage, wherein the forward tilt motor assembly comprises a first propulsion motor having a first shaft rotatably coupled to a first propeller, and wherein the forward tilt motor assembly is configured to vary an angle of orientation of the first shaft;
   an aft tilt motor assembly disposed at the aft end of the fuselage, wherein the aft tilt motor assembly comprises a second motor having a second shaft rotatably coupled to a second propeller, and wherein the aft tilt motor assembly is configured to vary an angle of orientation of the second shaft;
   a first boom disposed beneath the wing on a first side of the fuselage, wherein the first boom is aligned in parallel with a longitudinal axis of the unmanned aerial vehicle defined by the fuselage, wherein the first boom comprises a third propulsion motor having a third shaft rotatably coupled to a third propeller and a fourth propulsion motor having a fourth shaft rotatably coupled to a fourth propeller, wherein the third shaft is aligned perpendicular to the first boom, and wherein the fourth shaft is aligned perpendicular to the first boom;
   a first vertical fin mounted to the first boom, wherein the first vertical fin extends below the first boom;
   a second boom disposed beneath the wing on a second side of the fuselage, wherein the second boom is aligned in parallel with the longitudinal axis of the unmanned aerial vehicle, wherein the second boom comprises a fifth propulsion motor having a fifth shaft rotatably coupled to a fifth propeller and a sixth propulsion motor having a sixth shaft rotatably coupled to a sixth propeller, wherein the third shaft is aligned perpendicular to the second boom, and wherein the fourth shaft is aligned perpendicular to the second boom;
   a second vertical fin mounted to the second boom, wherein the second vertical fin extends below the second boom; and
   a tail shroud having a first end and a second end, wherein the first end of the tail shroud is joined to a trailing edge of the wing on the first side of the fuselage, wherein the second end of the tail shroud is joined to the trailing edge of the wing on the second side of the fuselage, and wherein the tail shroud extends astern of the aft end of the fuselage.

2. The unmanned aerial vehicle of claim 1, wherein the forward tilt motor assembly further comprises a servo, a worm drive in communication with the servo, a worm gear assembly meshed with the worm drive, and at least one thrust bearing disposed between the worm drive and the servo,
   wherein the worm gear assembly is coupled to the first propulsion motor,
   wherein the servo is configured to align the first shaft in parallel with a yaw axis of the unmanned aerial vehicle in response to a first control signal, and
   wherein the servo is configured to align the first shaft along the longitudinal axis of the unmanned aerial vehicle in response to a second control signal.

3. The unmanned aerial vehicle of claim 2, further comprising:
   a landing gear extension coupled to an external surface of the forward tilt motor assembly,
   wherein a first underside of the first vertical fin, a second underside of the second vertical fin and a free end of the landing gear extension are in a common plane when the first shaft is aligned in parallel with the yaw axis.

4. The unmanned aerial vehicle of claim 1, further comprising:
   a first imaging device mounted at a forward end of the first boom;
   a second imaging device mounted at a forward end of the second boom;
   a third imaging device mounted at an aft end of the first boom; and
   a fourth imaging device mounted at an aft end of the second boom.

5. The unmanned aerial vehicle of claim 1, further comprising:
   a control system having at least one computer processor, wherein the control system is configured to at least:
      cause the first shaft to be rotated forward into alignment with the longitudinal axis of the unmanned aerial vehicle;
      cause a first operation of the first propulsion motor in a first rotational direction;
      cause the second shaft to be rotated aft into alignment with the longitudinal axis of the unmanned aerial vehicle; and
      cause a second operation of the second propulsion motor in a second rotational direction.

6. The unmanned aerial vehicle of claim 5, wherein the control system is further configured to at least:
   cause the first shaft to be aligned in parallel with a yaw axis of the unmanned aerial vehicle;
   cause a third operation of the first propulsion motor in the first rotational direction;
   cause the second shaft to be aligned in parallel with the yaw axis of the unmanned aerial vehicle;
   cause a fourth operation of the second propulsion motor in the first rotational direction;
   cause a fifth operation of the third propulsion motor in the first rotational direction;
   cause a sixth operation of the fourth propulsion motor in the first rotational direction;
   cause a seventh operation of the fifth propulsion motor in the first rotational direction; and
   cause an eighth operation of the sixth propulsion motor in the first rotational direction.

7. An aerial vehicle comprising:
a fuselage having a first end and a second end, wherein the fuselage defines a longitudinal axis of the aerial vehicle extending between the first end and the second end;
a first tilt motor assembly disposed at the first end, wherein the first tilt motor assembly comprises a first propulsion motor and a first propeller rotatably coupled to a first shaft of the first propulsion motor, and wherein the first tilt motor assembly is configured to vary an axis of rotation of the first shaft;
a second tilt motor assembly disposed at the second end, wherein the second tilt motor assembly comprises a second propulsion motor and a second propeller rotatably coupled to a second shaft of the second motor, and wherein the second tilt motor assembly is configured to vary an axis of rotation of the second shaft;
a single wing mounted to an upper surface of the fuselage, wherein a centerline of the single wing is aligned above and in parallel with the longitudinal axis of the aerial vehicle;
a first boom mounted to an underside of the single wing on a first side of the fuselage, wherein the first boom is aligned in parallel with the longitudinal axis of the aerial vehicle, and wherein the first boom comprises a third propulsion motor and a third propeller rotatably coupled to a third shaft of the third propulsion motor; and
a second boom mounted to an underside of the single wing on a second side of the fuselage, wherein the second boom is aligned in parallel with the longitudinal axis of the aerial vehicle, and wherein the second boom comprises a fourth propulsion motor and a fourth propeller rotatably coupled to a fourth shaft of the fourth propulsion motor.

8. The aerial vehicle of claim 7, further comprising:
a tail shroud having a first end and a second end, wherein the first end of the tail shroud is mounted to a trailing edge of the single wing on the first side of the fuselage,
wherein the second end of the tail shroud is mounted to the trailing edge of the single wing on the second side of the fuselage, and
wherein the tail shroud extends astern of the fuselage.

9. The aerial vehicle of claim 8, wherein an aft end of the first boom is coupled to the tail shroud, and
wherein an aft end of the second boom is coupled to the tail shroud.

10. The aerial vehicle of claim 7, wherein the fuselage comprises:
a central structure;
a first narrowing section joined to the central structure, wherein the first narrowing section terminates in the first end; and
a second narrowing section joined to the central structure, wherein the second narrowing section terminates in the second end, and
wherein the first narrowing section is symmetrical to the second narrowing section.

11. The aerial vehicle of claim 7, wherein the first tilt motor assembly further comprises a servo, a worm drive in communication with the servo, a worm gear assembly meshed with the worm drive, and at least one thrust bearing disposed between the worm drive and the servo,
wherein the worm gear assembly is coupled to the first propulsion motor,
wherein the servo is configured to align the first shaft in parallel with a yaw axis of the unmanned aerial vehicle in response to a first control signal, and
wherein the servo is configured to align the first shaft along the longitudinal axis of the unmanned aerial vehicle in response to a second control signal.

12. The aerial vehicle of claim 7, further comprising:
a first fin extending below the first boom, wherein the first fin comprises a first control surface at a trailing edge of the first fin; and
a second fin extending below the second boom, wherein the second fin comprises a second control surface at a trailing edge of the second fin, and
wherein each of the first fin and the second fin has a common length.

13. The aerial vehicle of claim 12, further comprising:
a landing rod joined to an external surface of the first tilt motor assembly, wherein a free end of the landing rod extends below the first tilt motor assembly when the axis of rotation of the first shaft is aligned substantially vertically, and
wherein a free end of the landing rod is in a common plane with a first underside of the first fin and a second underside of the second fin when the landing rod extends below the first tilt motor assembly.

14. The aerial vehicle of claim 7, wherein the first boom comprises a fifth propulsion motor and a fifth propeller rotatably coupled to a fifth shaft of the fifth propulsion motor mounted therein,
wherein the third propulsion motor is disposed within the first boom at a predetermined distance forward of a center of gravity of the aerial vehicle,
wherein the fifth propulsion motor is disposed within the first boom at the predetermined distance aft of the center of gravity of the aerial vehicle,
wherein the second boom comprises a sixth propulsion motor and a sixth propeller rotatably coupled to a sixth shaft of the sixth propulsion motor mounted therein,
wherein the fourth propulsion motor is disposed within the second boom at the predetermined distance forward of the center of gravity of the aerial vehicle, and
wherein the fifth propulsion motor is disposed within the second boom at the predetermined distance aft of the center of gravity of the aerial vehicle.

15. The aerial vehicle of claim 7, wherein the first boom further comprises a first imaging device disposed in a forward end of the first boom,
wherein the second boom further comprises a second imaging device disposed in a forward end of the second boom,
wherein the third boom further comprises a third imaging device disposed in an aft end of the third boom, and
wherein the fourth boom further comprises a fourth imaging device disposed in an aft end of the fourth boom.

16. The aerial vehicle of claim 7, wherein the single wing further comprises:
a first control surface provided at a first radius from the centerline of the single wing on the first side of the fuselage;
a second control surface provided at a second radius from the centerline of the single wing on the first side of the fuselage;
a third control surface provided at the first radius from the centerline of the single wing on the second side of the fuselage; and
a fourth control surface provided at the second radius from the centerline of the single wing on the second side of the fuselage.

17. The aerial vehicle of claim 7, wherein an aspect ratio of the single wing is not less than thirteen.

18. A method to operate an aerial vehicle,
wherein the aerial vehicle comprises:
- a fuselage defining a substantially rectangular section having a forward pyramidal section terminating in a forward end of the fuselage and an aft pyramidal section terminating in an aft end of the fuselage, wherein the forward pyramidal section is symmetrical to the aft pyramidal section;
- a forward tilt motor assembly disposed at the forward end of the fuselage, wherein the forward tilt motor assembly comprises a first worm gear assembly having a first propulsion motor joined thereto, a first propeller rotatably coupled to a first shaft of the first propulsion motor, a first worm drive meshed with the first worm gear assembly and a first servo configured to cause the first worm drive to vary an angle of the first shaft;
- an aft tilt motor assembly disposed at the aft end of the fuselage, wherein the aft tilt motor assembly comprises a second worm gear assembly having a second propulsion motor joined thereto, a second propeller rotatably coupled to a second shaft of the second propulsion motor, a second worm drive meshed with the second worm gear assembly and a second servo configured to cause the second worm drive to vary an angle of the second shaft;
- a wing joined to the fuselage;
- a first boom joined to an underside of the wing on a first side of the fuselage, wherein the first boom is aligned in parallel with a longitudinal axis of the aerial vehicle, wherein the first boom comprises a third propulsion motor and a third propeller rotatably coupled to a third shaft of the third propulsion motor, wherein the third shaft is aligned substantially perpendicular to a yaw axis of the aerial vehicle; and
- a second boom joined to the underside of the wing on a second side of the fuselage, wherein the second boom is aligned in parallel with the longitudinal axis of the aerial vehicle, wherein the second boom comprises a fourth propulsion motor and a fourth propeller rotatably coupled to a fourth shaft of the fourth propulsion motor, wherein the fourth shaft is aligned substantially perpendicular to the yaw axis of the aerial vehicle, and wherein the method comprises:
- causing, by the first servo, the first shaft to be aligned in parallel with the yaw axis of the aerial vehicle;
- causing, by the second servo, the second shaft to be aligned in parallel with the yaw axis of the aerial vehicle;
- initiating an operation of the first propulsion motor in a first rotational direction;
- initiating an operation of the second propulsion motor in the first rotational direction;
- initiating an operation of the third propulsion motor in the first rotational direction; and
- initiating an operation of the fourth propulsion motor in the first rotational direction,
wherein each of the first propeller, the second propeller, the third propeller and the fourth propeller is configured to rotate within a common plane.

19. The method of claim 18, wherein the aerial vehicle further comprises:
- a control system disposed within the forward pyramidal section of the fuselage;
- a payload engagement system disposed within the substantially rectangular section of the fuselage; and
- a power supply disposed within the aft pyramidal section of the fuselage,
wherein a center of gravity of the aerial vehicle is within the substantially rectangular section of the fuselage.

20. The method of claim 18, further comprising:
causing, by the first servo, the first shaft to be aligned along the longitudinal axis of the aerial vehicle; and
after the first shaft is aligned along the longitudinal axis of the aerial vehicle,
- causing, by the second servo, the second shaft to be aligned along the longitudinal axis of the aerial vehicle;
- initiating an operation of the second propulsion motor in a second rotational direction;
- stopping the operation of the third propulsion motor; and
- stopping the operation of the fourth propulsion motor.

* * * * *